US009094687B2

(12) United States Patent
Koyama et al.

(10) Patent No.: US 9,094,687 B2
(45) Date of Patent: Jul. 28, 2015

(54) VIDEO ENCODER AND VIDEO DECODER

(75) Inventors: Junpei Koyama, Kawasaki (JP); Akira Nakagawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 625 days.

(21) Appl. No.: 13/530,514

(22) Filed: Jun. 22, 2012

(65) Prior Publication Data

US 2012/0263237 A1  Oct. 18, 2012

Related U.S. Application Data

(63) Continuation of application No. PCT/JP2009/007360, filed on Dec. 28, 2009.

(51) Int. Cl.
*H04N 11/02* (2006.01)
*H04N 19/573* (2014.01)
*H04N 19/61* (2014.01)

(52) U.S. Cl.
CPC ............ *H04N 19/573* (2014.11); *H04N 19/61* (2014.11)

(58) Field of Classification Search
CPC ............... H04N 19/573; H04N 19/61; H04N 19/00587; H04N 19/109; H04N 19/13; H04N 19/146; H04N 19/176; H04N 19/52; H04N 19/12; H04N 19/51; H04N 19/577; H04N 19/60
USPC ........................................ 375/240.01–240.29
See application file for complete search history.

(56) References Cited

U.S. PATENT DOCUMENTS 5,235,419 A * 8/1993 Krause ................. 375/240.16
6,430,224 B1 * 8/2002 Naito et al. ............ 375/240.16
6,785,331 B1 * 8/2004 Jozawa et al. .......... 375/240.12
2003/0048208 A1 * 3/2003 Karczewicz ................ 341/67
2003/0103679 A1   6/2003 Etoh et al.
(Continued)

FOREIGN PATENT DOCUMENTS

JP          3-283989         12/1991
JP          6-232765         8/1994
(Continued)

OTHER PUBLICATIONS

International Search Report of PCT/JP2009/007360 mailed Apr. 13, 2010.
(Continued)

*Primary Examiner* — Sath V Perungavoor
*Assistant Examiner* — Nathnael Aynalem
(74) *Attorney, Agent, or Firm* — Staas & Halsey LLP

(57) ABSTRACT

A video encoder includes: a motion compensation signal generator to generate a plurality of motion compensation signals in accordance with an encoding target signal and a plurality of reference pictures; a prediction signal generator to generate a prediction signal of the encoding target signal by utilizing the plurality of motion compensation signals; a prediction error signal generator to generate a prediction error signal; a selector to select, from among a plurality of generation rules for generating encoded information of the prediction error signal, a generation rule that is expected to reduce an information amount of an encoded state of the prediction error signal, in accordance with the plurality of motion compensation signals; and an encoded information generator to generate encoded information of the prediction error signal in accordance with the generation rule selected by the selector.

17 Claims, 21 Drawing Sheets

(56) References Cited

U.S. PATENT DOCUMENTS

| | | | |
|---|---|---|---|
| 2003/0112870 A1* | 6/2003 | Fukuda et al. | 375/240.12 |
| 2004/0233990 A1* | 11/2004 | Sekiguchi et al. | 375/240.16 |
| 2007/0189396 A1 | 8/2007 | Kitahara et al. | |
| 2008/0240240 A1* | 10/2008 | Kodama | 375/240.14 |
| 2009/0097571 A1* | 4/2009 | Yamada et al. | 375/240.25 |
| 2010/0246680 A1* | 9/2010 | Tian et al. | 375/240.16 |

FOREIGN PATENT DOCUMENTS

| | | |
|---|---|---|
| JP | 2000-59785 | 2/2000 |
| JP | 2001-094982 | 4/2001 |
| JP | 2002-314428 | 10/2002 |
| JP | 2002-315006 | 10/2002 |
| JP | 2005-86384 | 3/2005 |
| JP | 2008-92456 | 4/2008 |
| WO | 2006/073116 | 7/2006 |

OTHER PUBLICATIONS

Written Opinion of the International Searching Authority mailed Apr. 13, 2010 in corresponding International Patent Application No. PCT/JP2009/007360.

International Preliminary Report on Patentability mailed Jul. 4, 2012 issued in corresponding International Patent Application No. PCT/JP2009/007360.

Japanese Office Action mailed Dec. 24, 2013 in corresponding Japanese Application No. 2011-548865.

Written Opinion of the International Searching Authority mailed Apr. 13, 2010 in corresponding International Patent Application No. PCT/JP2010/000101.

International Preliminary Report on Patentability issued Jul. 10, 2012 issued in corresponding International Patent Application No. PCT/JP2010/000101.

International Search Report mailed Apr. 13, 2010 in corresponding International Application No. PCT/JP2010/000101.

* cited by examiner

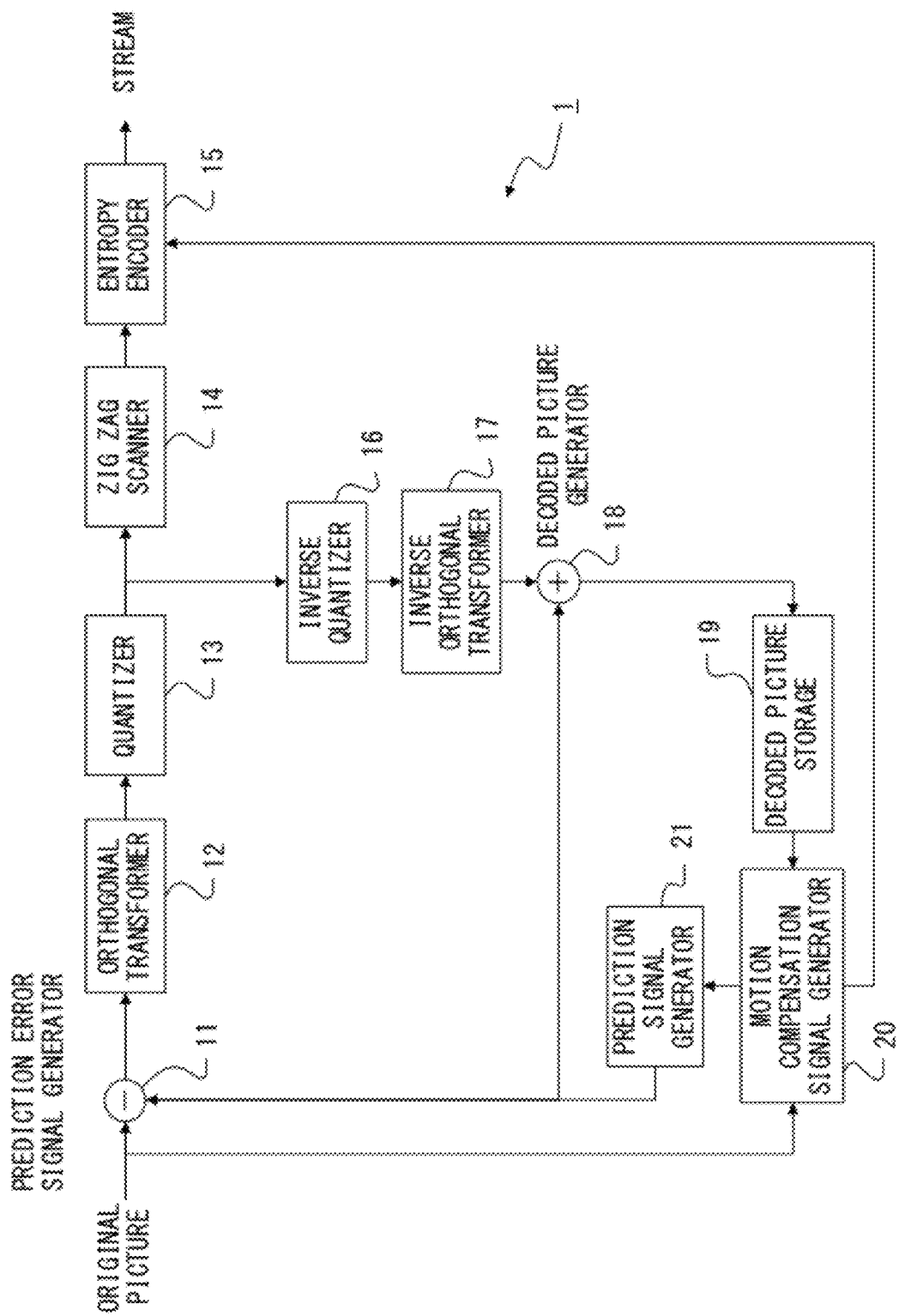
F I G. 1

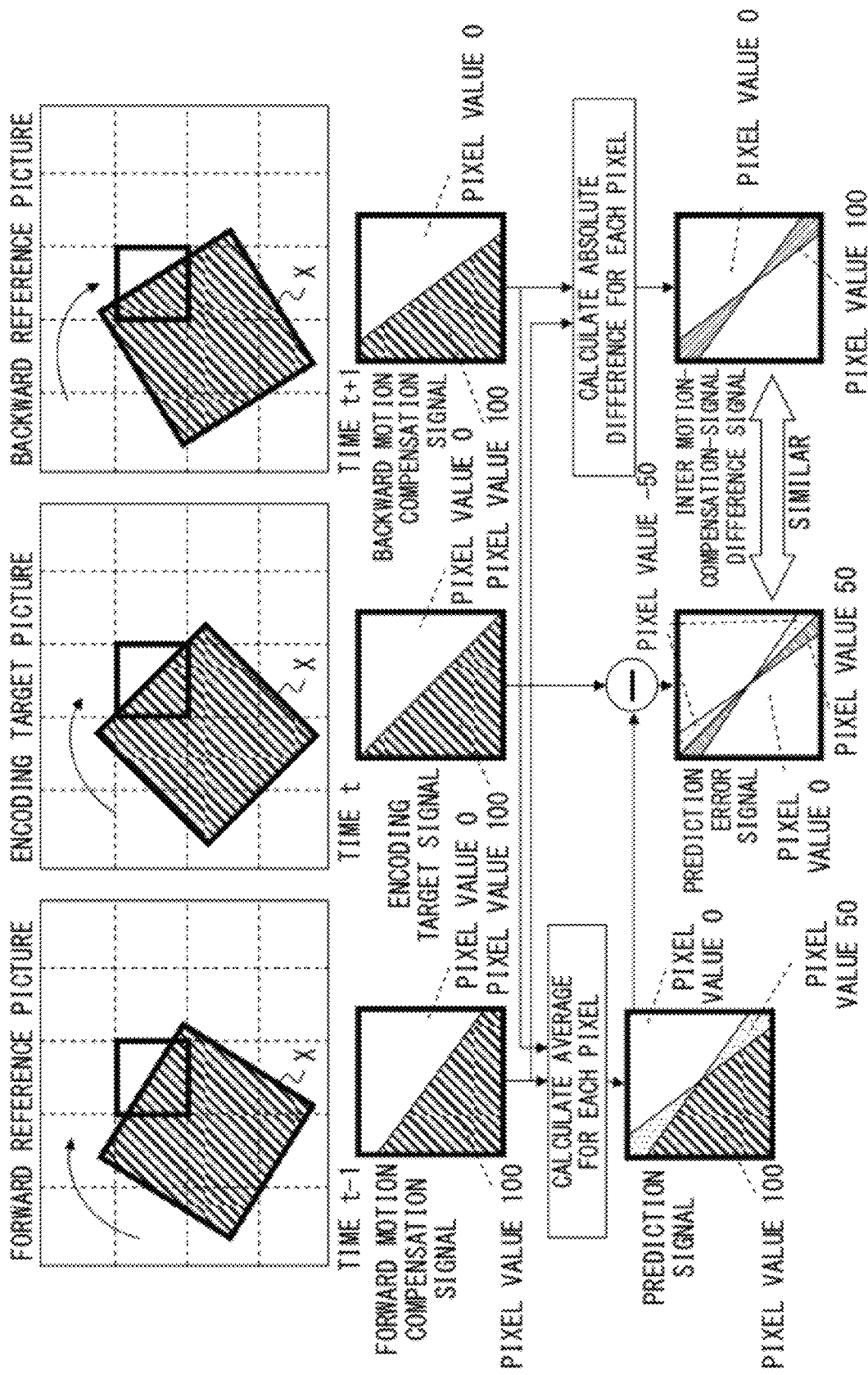
F I G. 4

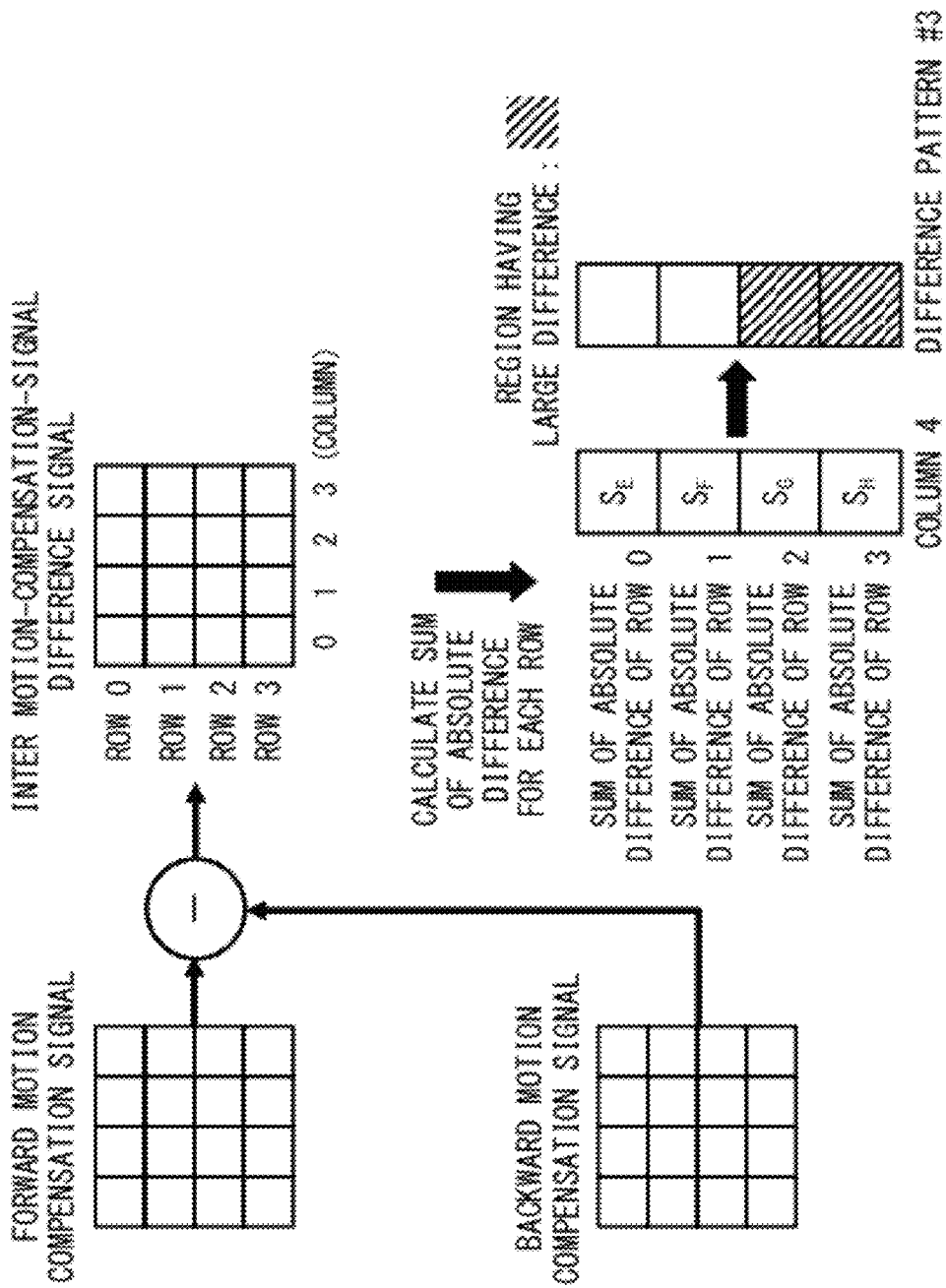
F I G. 11

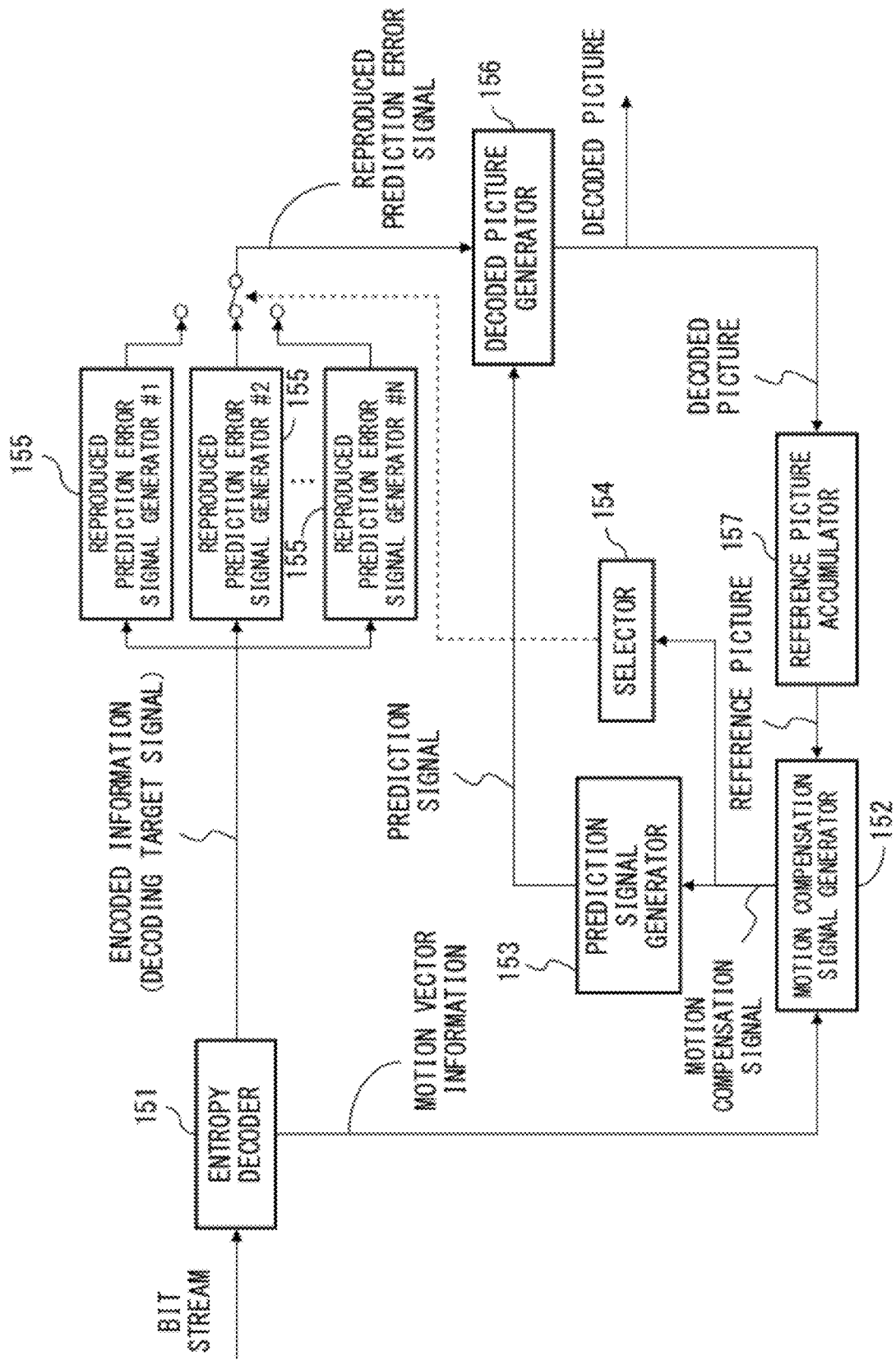
F I G. 13

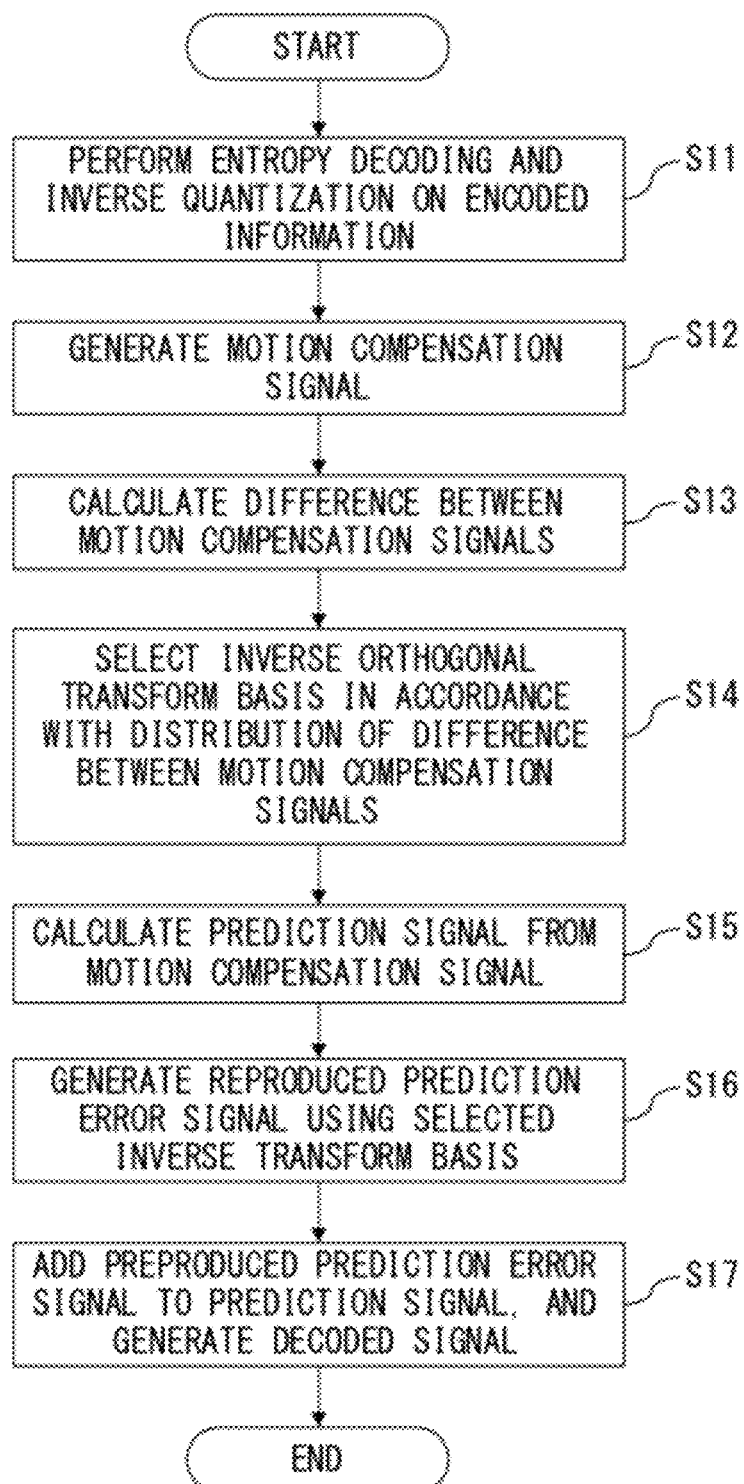
F I G. 16

VIDEO ENCODER AND VIDEO DECODER

CROSS-REFERENCE TO RELATED APPLICATION

This application is a continuation of an international application PCT/JP2009/007360, which was filed on Dec. 28, 2009.

FIELD

The embodiments described herein are related to an encoder, an encoding method, and an encoding program to encode video data, and also to a decoder, a decoding method, and a decoding program to decode encoded video data.

BACKGROUND

Video data is encoded in highly efficient encoding scheme when it is transmitted from a transmitter device to a receiver device, when it is stored in a storage device, or in other situations. "Highly efficient encoding" is an encoding process to transform a data stream into a different data stream in order to compress the data volume.

As a highly efficient encoding method for video data, an intra-picture prediction (intra prediction) encoding scheme is known. This encoding scheme utilizes high spatial correlation in video data. That is to say, in this encoding scheme, it is possible to restore an image in a picture by using only information included in that picture without using other pictures. As another highly efficient encoding method, an inter-picture prediction (inter prediction) encoding scheme is known. This encoding scheme utilizes characteristic in which video data has a high correlation in time direction. Note that a picture at certain timing is similar to a picture at immediately previous timing in video data. Inter-prediction encoding scheme utilizes this characteristic so as to encode pictures.

In the inter-picture prediction encoding scheme, an original picture is divided into a plurality of blocks. An encoder selects, for each block, a region similar to an original picture block from the decoded picture of an encoded frame, and calculates the difference between the selected similar region and the original picture block so as to remove redundancy in time direction. Then, vector information representing the similar region and the difference information with the redundancy having been removed are encoded so as to achieve a high compression rate.

For example, in a data transmission system employing inter-prediction encoding, a transmitter device generates motion vector data representing "motion" toward a target picture from the previous picture, and also generates difference data between the predicted image of the target picture and the actual image of the target picture, and transmits to the receiver device the generated motion vector data and difference data. The predicted image is generated using the previous picture and the motion vector data. The receiver device reproduces the target picture from the received motion vector data and difference data. Note that as moving picture encoding schemes, there are ISO/IEC MPEG-2 and MPEG-4 (hereinafter, referred to as MPEG-2 and MPEG-4).

According to MPEG-2, I-picture, P-picture, and B-picture are defined. The I-picture is obtained by encoding information only within the picture. The P-picture is obtained by performing forward-direction inter-picture prediction in accordance with a past picture and encoding the prediction error. The B-picture is obtained by performing bi-directional inter-picture prediction in accordance with a past picture and a future picture, and encoding the prediction error.

Highly efficient methods (i.e., a high compression rate) are desirable in video encoding/decoding. As a method for enhancing encoding/decoding efficiency, a signal encoding method including the first through third steps described below is proposed. The first step obtains as a reference signal a signal in a correlation with an encoding target signal. The second step derives, in accordance with the characteristic of the obtained reference signal, a transform basis serving as fundamentals of the transform rule. The third step transforms the encoding target signal in accordance with the transform rule based on the derived transform basis so as to encode the signal. (Japanese Laid-open Patent Publication No. 2002-314428 for example)

Also, as a related technique, a predictive decoding device is proposed in Japanese Laid-open Patent Publication No. 2000-59785.

As described above, highly efficient methods are desirable for video encoding and decoding. Further, various methods for enhancing efficiency in encoding/decoding are proposed. However, further improvement is required in encoding and decoding of video data.

SUMMARY

According to an aspect of the invention, a video encoder includes: a motion compensation signal generator to generate a plurality of motion compensation signals in accordance with an encoding target signal representing an encoding target picture and a plurality of reference pictures; a prediction signal generator to generate a prediction signal of the encoding target signal by utilizing the plurality of motion compensation signals; a prediction error signal generator to generate a prediction error signal representing a difference between the encoding target signal and the prediction signal; a selector to select, from among a plurality of generation rules for generating encoded information of the prediction error signal, a generation rule that is expected to reduce an information amount of an encoded state of the prediction error signal, in accordance with the plurality of motion compensation signals; and an encoded information generator to generate encoded information of the prediction error signal in accordance with the generation rule selected by the selector.

According to another aspect of the invention, a video encoder that encodes an encoding target signal including a luminance signal and a color difference signal, includes: a luminance prediction signal generator to generate a luminance prediction signal representing a predicted value of a luminance signal; a luminance prediction error signal generator to generate a luminance prediction error signal representing a difference between the luminance signal of the encoding target signal and the luminance prediction signal; a color difference prediction signal generator to generate a color difference prediction signal representing a predicted value of a color difference signal; a color difference prediction error signal generator to generate a color difference prediction error signal representing a difference between the color difference signal of the encoding target signal and the color difference prediction signal; a selector to select, from among a plurality of generation rules for generating luminance encoded information from the luminance prediction error signal, a generation rule that is expected to reduce an information amount of an encoded state of the luminance prediction error signal, in accordance with the color difference prediction error signal; and a luminance encoded information generator to generate luminance encoded information from the luminance prediction error signal in accordance with the generation rule selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a video encoder according to an embodiment;

FIG. 4 explains a correlation between a prediction error signal and a motion compensation signal;

FIGS. 9-12 illustrate other embodiments of selecting a basis;

FIG. 13 illustrates a configuration of a decoder according to the first embodiment;

FIG. 16 is a flowchart indicating a decoding method according to the first embodiment;

DESCRIPTION OF EMBODIMENTS

Figure 2:
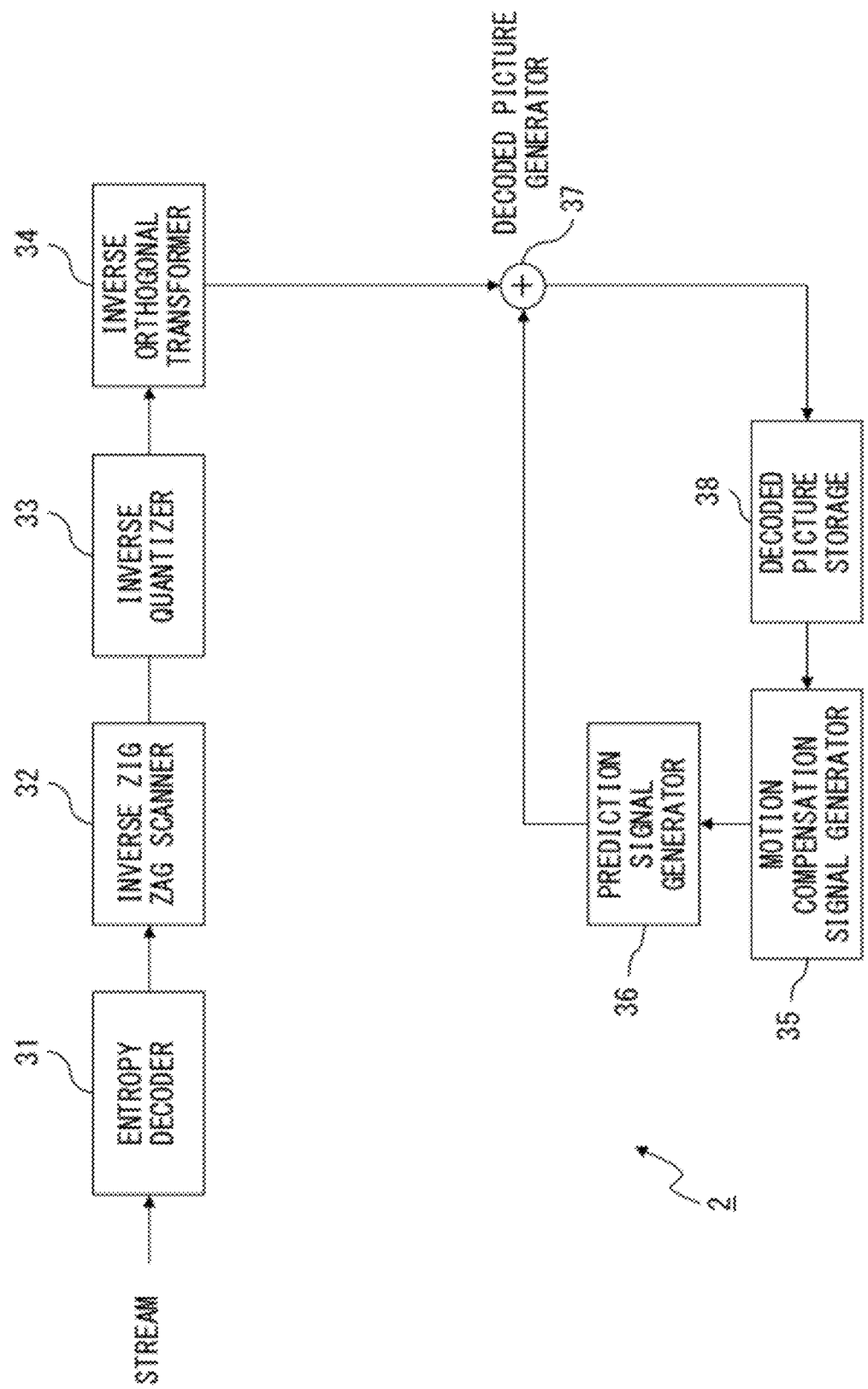
FIG. 2 illustrates a configuration of a video decoder according to an embodiment.

FIG. 1 illustrates a configuration of a video encoder according to an embodiment. A video encoder 1 illustrated in FIG. 1 includes a prediction error signal generator 11, an orthogonal transformer 12, a quantizer 13, a zigzag scanner 14, an entropy encoder 15, an inverse quantizer 16, an inverse orthogonal transformer 17, a decoded picture generator 18, a decoded picture storage 19, a motion compensation signal generator 20, and a prediction signal generator 21. The video encoder 1 divides each picture of a video into a plurality of blocks, and performs an encoding process on each of the blocks. The size of the blocks may be fixed or may be variable.

Block data representing the image in each block obtained by dividing an original picture (an encoding target picture) is input to the prediction error signal generator 11. The size of a block is, for example, 16×16 pixels (macro block). The prediction error signal generator 11 calculates the difference between the encoding target block data and a prediction signal (the block data of a predicted picture provided by the prediction signal generator 21) so as to generate a prediction error signal.

The orthogonal transformer 12 performs an orthogonal transform process on the prediction error signal. This orthogonal transform generates a frequency domain signal, in which horizontal frequency components and vertical frequency components are separated. Orthogonal transform is, for example, a discrete cosine transform (DCT). The quantizer 13 quantizes a signal output from the orthogonal transformer 12. By the quantization, the amount of code of the transformed prediction error signal is reduced. A signal output from the quantizer 13 is provided to the zigzag scanner 14 and the inverse quantizer 16.

The zigzag scanner 14 scans a signal (a plurality of coefficients) output from the quantizer 13 in accordance with a specified scanning pattern, and generates run-level information. Run-level information includes information representing a value of a coefficient that is not zero (level), information representing a length over which zeros continue (run), and the like. The entropy encoder 15 performs entropy encoding (variable-length encoding) on the run-level information output from the zigzag scanner 14. In entropy encoding, codes having variable lengths are assigned in accordance with the appearance frequency of symbols.

The inverse quantizer 16 inversely quantizes a signal output from the quantizer 13. The inverse orthogonal transformer 17 performs inverse orthogonal transform on a signal output from the inverse quantizer 16. Processes performed by the inverse quantizer 16 and the inverse orthogonal transformer 17 correspond to processes performed by the quantizer 13 and the orthogonal transformer 12, respectively. In other words, by performing decoding processes by using the inverse quantizer 16 and the inverse orthogonal transformer 17, a signal similar to the prediction error signal (referred to as reproduced prediction error signal, hereinafter) is obtained.

The decoded picture generator 18 adds a reproduced prediction error signal output from the inverse orthogonal transformer 17 to a block data of a predicted image generated by the prediction signal generator 21. Thereby, a locally-decoded picture is generated. The decoded picture storage 19 stores, as data of a new reference picture, block data generated by the decoded picture generator 18.

The motion compensation signal generator 20 calculates the motion vector of the encoding target block according to block data of an encoding target block of the original picture and block data of a reference picture stored in the decoded picture storage 19. A motion vector is a value representing a spatial shift between the original picture and a reference picture, and is implemented by, for example, a block matching technique, which searches for the position of the block in a reference picture that is the most similar to the encoding target block in the original picture. The motion compensation signal generator 20 performs motion compensation in accordance with the motion vector, and generates block data of the reference picture to which motion compensation has been applied.

The prediction signal generator 21 generates a prediction signal of an encoding target signal in accordance with the block data of a reference picture obtained by the motion compensation signal generator 20. This prediction signal is provided to the prediction error signal generator 11 as described above.

FIG. 2 illustrates a configuration of a video decoder according to an embodiment. A video decoder 2 illustrated in FIG. 2 includes an entropy decoder 31, an inverse zigzag scanner 32, an inverse quantizer 33, an inverse orthogonal transformer 34, a motion compensation signal generator 35, a prediction signal generator 36, a decoded picture generator 37, and a decoded picture storage 38. The video decoder 2 decodes encoded information generated by the video encoder 1 illustrated in FIG. 1 so as to reproduce the image.

The entropy decoder 31, the inverse zigzag scanner 32, the inverse quantizer 33, and the inverse orthogonal transformer 34 perform processes corresponding to those performed by the entropy encoder 15, the zigzag scanner 14, the quantizer 13, and the orthogonal transformer 12 illustrated in FIG. 1, respectively. Thus, a prediction error signal is reproduced from a received data stream.

The motion compensation signal generator 35 generates a motion compensation signal using a reference picture stored in the decoded picture storage 38 and a motion vector received from the encoder. The prediction signal generator 36 generates, in accordance with the motion compensation signal, a prediction signal representing the predicted value of a decoded picture. The motion compensation signal generator 35 and the prediction signal generator 36 generate a prediction signal using substantially the same method as that used by the motion compensation signal generator 20 and the prediction signal generator 21 illustrated in FIG. 1.

The decoded picture generator 37 adds, to a prediction signal generated by the prediction signal generator 36, a signal output from the inverse orthogonal transformer 34 (i.e., a reproduced prediction error signal) so as to generate a decoded picture. The generated decoded picture is stored in the decoded picture storage 38 as a reference picture to be used in subsequent decoding processes.

First Embodiment

Figure 3:
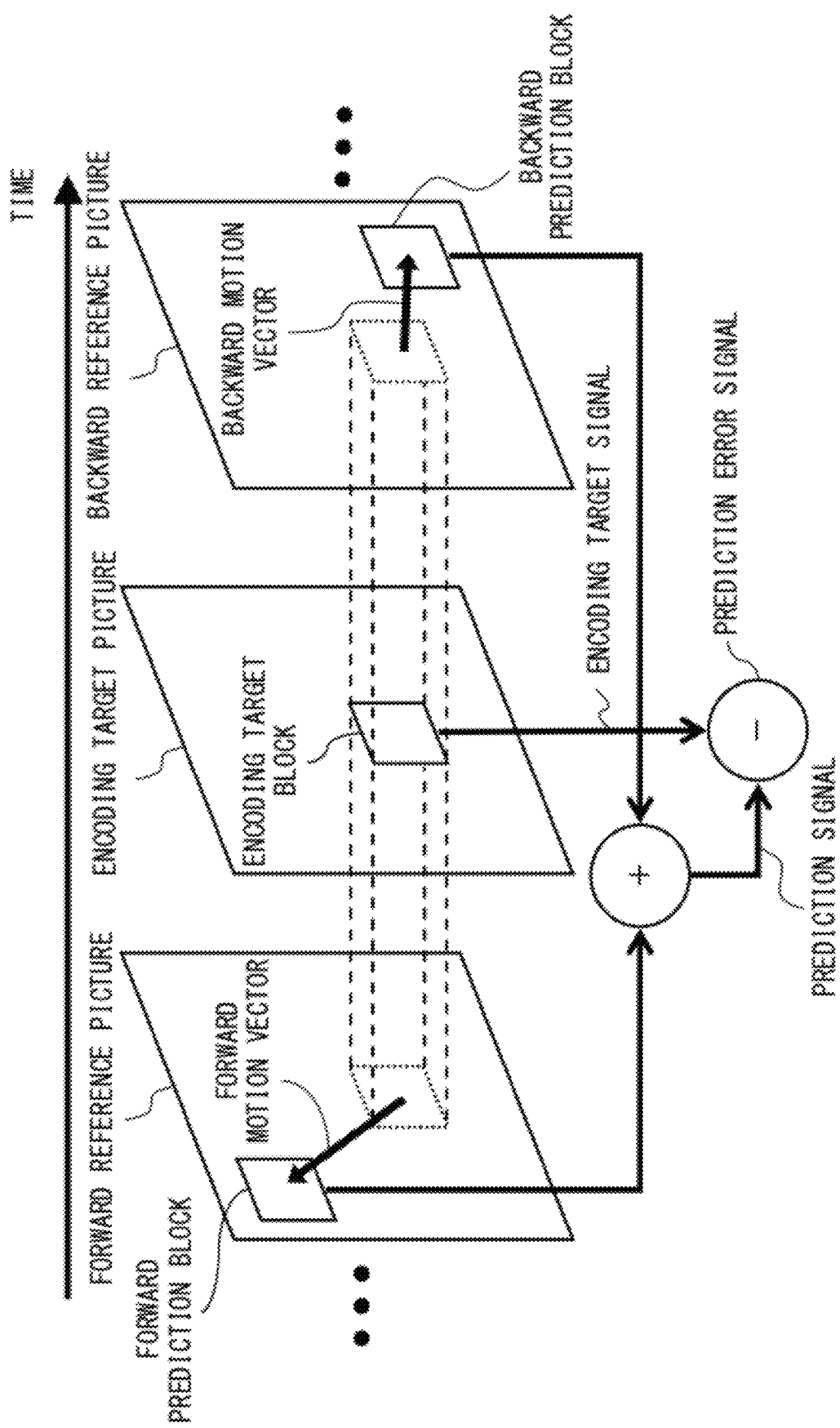
FIG. 3 explains bi-directional prediction.

FIG. 3 explains bi-directional prediction. In bi-directional prediction (or bi-predictive), a forward reference picture and a backward reference picture are used. A forward reference picture (forward motion compensation picture) is selected from among a plurality of reference pictures displayed prior to an encoding target picture. Similarly, a backward reference picture (backward motion compensation picture) is selected from among a plurality of reference pictures displayed posterior to the encoding target picture.

A forward prediction block is the picture block that is the most similar to the encoding target block in the forward reference picture. A forward motion vector represents "motion" between the encoding target block and a forward prediction block. Further, a forward motion compensation signal representing the image of a forward prediction block is generated. Similarly, a backward prediction block is the picture block that is the most similar to the encoding target block in the backward reference picture. A backward motion vector represents "motion" between the encoding target block and a backward prediction block. Further, a backward motion compensation signal representing the image of a backward prediction block is generated.

The prediction signal of an encoding target signal is generated by calculating the average between the forward motion compensation signal and the backward motion compensation signal. Thereafter, a prediction error signal representing the difference between the encoding target signal and the prediction signal, the forward motion vector information, and the backward motion vector information are encoded. Although FIG. 3 depicts an adder to add a forward motion compensation signal and a backward motion compensation signal to each other, the added value is divided by two in an actual configuration. Also, according to H.264, two reference pictures are generated from a plurality of arbitrary reference pictures, and those two reference pictures are weighted and added to each other so that the resultant value is used as a B-picture-predicted picture.

FIG. 4 explains a correlation between a prediction error signal and a motion compensation signal. In the example illustrated in FIG. 4, square object X is rotating in the clockwise direction. In this example, the encoding target picture at time t is encoded by using the forward reference picture at time t−1 and the backward reference picture at time t+1. Additionally, the forward motion vector and the backward motion vector are both zero in this example. Also, pixel values in the region occupied by object X are assumed to be 100, and pixel values in the background regions are assumed to be zero. Pixel values are, for example, luminance levels, although the scope of the present invention is not limited to this example.

As a forward motion compensation block, the region having the smallest difference from the encoding target block is selected. However, because object X is rotating, an image that is completely the same as the image in the encoding target block is not detected in the forward reference picture. In other words, in the forward reference picture, a picture block having a slight difference from the encoding target block is extracted. Similarly, in the backward reference picture, a picture block having a slight difference from the encoding target block is extracted.

As explained in FIG. 3, a prediction signal is generated by averaging a forward motion compensation signal and a backward motion compensation signal for each pixel. In such a case, the pixel value of each pixel of a prediction signal is "100" in the region in which object X exists in both the forward motion compensation signal and the backward motion compensation signal, is "50" in the region in which object X exists in only one of the motion compensation signals, and is "0" in the region in which both of the compensation signals are in the background.

The prediction signal is subtracted from the encoding target signal for each pixel, and a prediction error signal is generated. This prediction error signal has, as illustrated in FIG. 4, pixels with pixel value of "50" and pixels with pixel value of "−50" along the boundary portion between object X and the background in the encoding target picture.

Here, the difference between a forward motion compensation signal and a backward motion compensation signal is discussed. The inter motion-compensation-signal difference signal (or the inter-prediction difference signal) illustrated in FIG. 4 is obtained by calculating the absolute value of difference between two motion compensation pictures. Accordingly, an inter motion-compensation-signal difference signal has pixels with the pixel value of 100 along the boundary portion between object X and the background in the encoding target picture.

When prediction error signal and inter motion-compensation-signal difference signal are compared, they have approximately the same shape as the regions with pixel values other than zero. In other words, a prediction error exists in a region in which a forward motion compensation signal and a backward motion compensation signal have pixel values different from each other. Accordingly, there is a high correlation between the distribution of pixel values of inter motion-compensation-signal difference signal and the distribution of pixel values of the prediction error signal.

Figure 5:
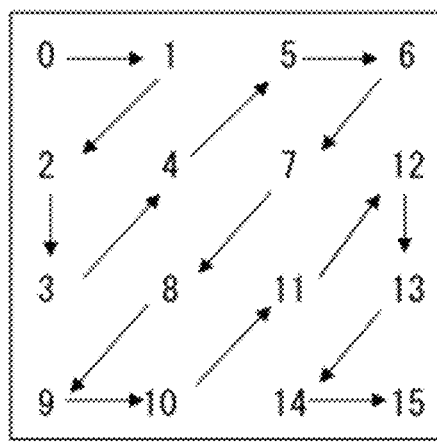
FIG. 5 illustrates an example of zigzag scan.

In the encoder illustrated in FIG. 1, a prediction error signal receives an orthogonal transform, and thereafter receives entropy encoding. In this configuration, a plurality of coefficients obtained through the orthogonal transform are scanned in accordance with, for example, the scanning pattern illustrated in FIG. 5, and encoded into run-level information so as to be transmitted to the entropy encoder 15. When the plurality of coefficients obtained through the orthogonal transform are distributed in, for example, low-frequency component area, the information amount of encoded data obtained by entropy encoding is reduced. By contrast, the distribution of coefficients obtained by orthogonally transforming prediction error signal depends upon the distribution of the pixel values of the prediction error signal. Accordingly, when the distribution of pixel values of the prediction error signal is detected and an orthogonal transforming scheme is selected appropriately in accordance with the detected distribution, the information amount of encoded data can be reduced.

In an encoding method according to the first embodiment, the above correlation (between prediction error signal and the inter motion-compensation-signal difference signal) is utilized in order to reduce the information amount of encoded data. In other words, a scheme of orthogonally transforming a prediction error signal is appropriately selected in accordance with the pixel-value distribution of the inter motion-compensation-signal difference signal instead of the pixel-value distribution of the prediction error signal.

Figure 6:
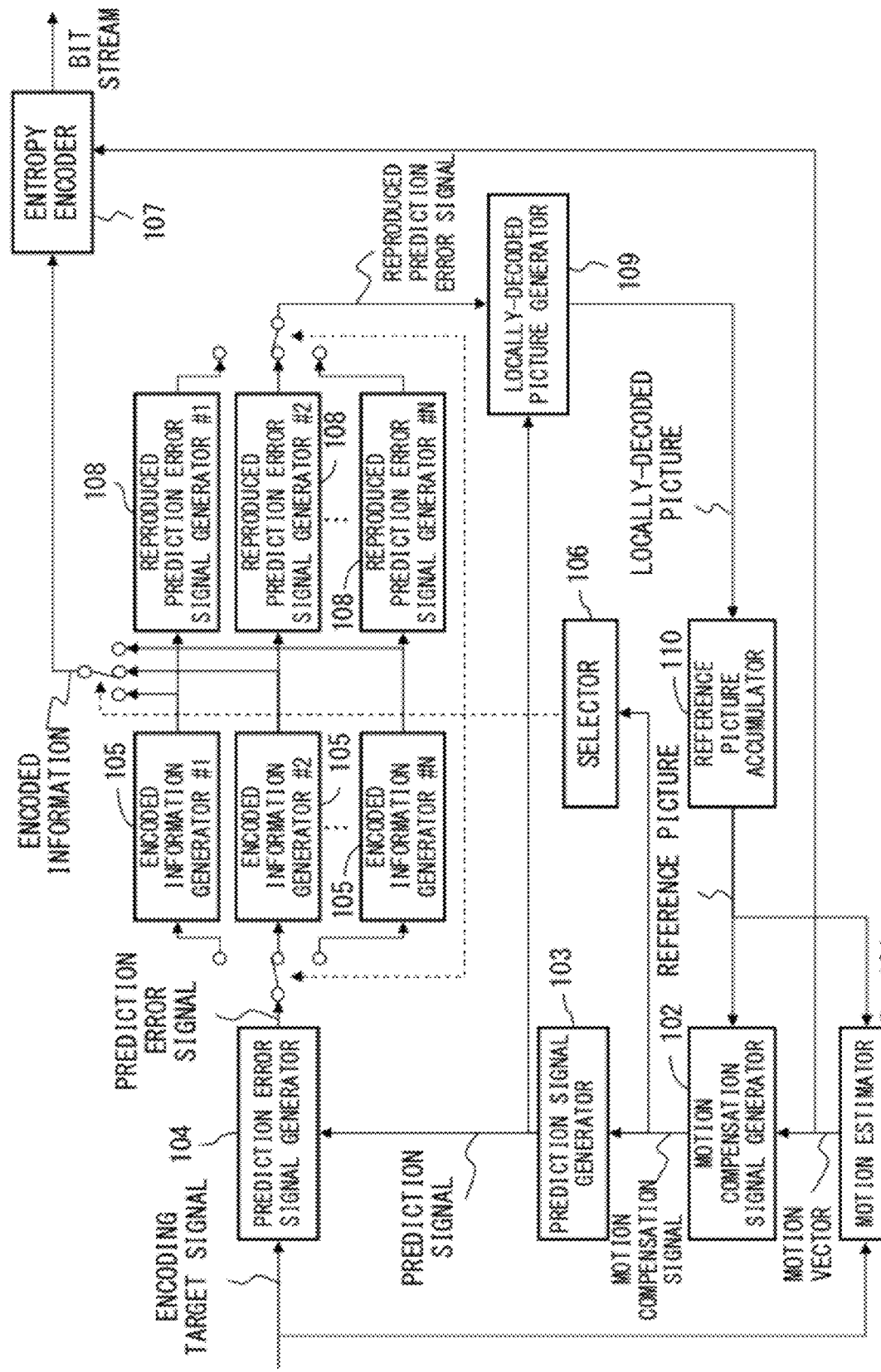
FIG. 6 illustrates a configuration of an encoder according to a first embodiment.

FIG. 6 illustrates a configuration of an encoder according to the first embodiment. In FIG. 6, each of the video pictures is divided into a plurality of blocks so that the encoder encodes image data for each block. Note that an encoding target signal represents the image in an encoding target block in FIG. 6.

A motion estimator 101 generates one or a plurality of motion vectors in accordance with an encoding target signal representing an encoding target block and a plurality of reference pictures. Also, a motion compensation signal generator 102 generates one or a plurality of motion compensation signals in accordance with the motion vector(s) and a plurality of reference pictures. For example, in bi-directional prediction, the motion estimator 101 generates a forward motion vector and a backward motion vector, and the motion compensation signal generator 102 generates a forward motion compensation signal and a backward motion compensation signal. The motion estimator 101 may be included in the motion compensation signal generator 102.

A prediction signal generator 103 utilizes the motion compensation signal in order to generate a prediction signal representing the predicted value of the encoding target signal. The prediction signal generator 103 is implemented, for example, by inter prediction or a bi-directional prediction (B picture) employed by MPEG-1, MPEG-2, H.264/MPEG-4 AVC, and the like, or by intra prediction employed by H.264/MPEG-4 AVC and the like. A prediction mode that specifies a prediction method (intra prediction mode of H.264/MPEG-4 AVC, vector of inter prediction, or the like) is determined by a specified prediction-mode determining algorithm. A method of determining a prediction mode is implemented by, for example, an existing intra prediction mode determination method, an existing vector estimation method, or the like.

As explained by referring to FIG. 3, a prediction error signal generator 104 generates a prediction error signal representing the difference between the encoding target signal and the prediction signal. This prediction error signal is transmitted to an encoded information generator 105.

The encoded information generator 105 generates encoded information from the prediction error signal in accordance with a generation rule selected from among a plurality of generation rules #1 through #N. In FIG. 6, encoded information generators #1 through #N generate encoded information from the prediction error signal in accordance with generation rules #1 through #N, respectively. The encoded information generator 105 corresponds to the orthogonal transformer 12 and the quantizer 13 illustrated in FIG. 1.

The encoded information generator 105 is implemented by, for example, a combination of orthogonal transform and quantization employed by MPEG-1, MPEG-2, H.264/MPEG-4 AVC, and the like. In such a case, encoded information corresponds to a quantization result of each coefficient obtained by orthogonal transform. Also, the encoded information generator 105 may be implemented by Wavelet transform, DPCM, vector quantization, and the like employed by JPEG-2000 and the like.

In the above configuration, at a pixel position with a large prediction error, which represents the difference between an encoding target signal and a prediction signal, differences between a plurality of motion compensation signals used for generating that prediction signal are also large in bi-directional prediction, as described above. In other words, there is a correlation between the distribution of the prediction error signal and the distribution of difference values between motion compensation signals. For example, when the prediction error in the upper right region in an encoding target block is large, the differences between motion compensation signals in the corresponding region are also large. Thus, in the first embodiment, by utilizing this correlation, a generation rule for generating encoded information (i.e., encoded information generators #1 through #N) is selected in accordance with the distribution of the differences between a plurality of motion compensation signals used for generating a prediction signal.

A selector 106 selects, in accordance with the differences between motion compensation signals, a generation rule (encoded information generators #1 through #N) for generating encoded information from the prediction error signal. For example, the selector 106 calculates the difference between a forward motion compensation signal and a backward motion compensation signal so as to generate an inter motion-compensation-signal difference signal as illustrated in FIG. 4. The selector 106 selects, in accordance with this inter motion-compensation-signal difference signal, a generation rule that is expected to minimize the information amount of the encoded state of the prediction error signal. Then, the encoded information generator 105 generates encoded information from the prediction error signal in accordance with the generation rule selected by the selector 106.

An entropy encoder 107 performs entropy encoding on the encoded information generated by the encoded information generator 105 in order to generate entropy encoded information. "Encoded information" has been generated in accordance with a generation rule expected to minimize the information amount of the entropy encoded state of the encoded information. Accordingly, the information amount of an encoded data stream generated by the encoder according to the first embodiment is small. The entropy encoder 107 also encodes motion vector information representing the motion vector. Note that the zigzag scanner is omitted in FIG. 6.

A reproduced prediction error signal generator 108 generates a reproduced prediction error signal from the encoded information in accordance with a reproduction rule selected from among a plurality of reproduction rules #1 through #N. In FIG. 6, reproduced prediction error signal generators #1 through #N generate reproduced prediction error signals from the encoded information in accordance with reproduction rules #1 through #N, respectively. Reproduction rules #1 through #N correspond to generation rules #1 through #N, respectively. In other words, reproduction rules #1 through #N define the inverse processes of processes of generation rules #1 through #N, respectively. The reproduced prediction error signal generator 108 corresponds to the inverse quantizer 16 and the inverse orthogonal transformer 17 illustrated in FIG. 1.

The selector 106 selects, in accordance with the difference between motion compensation signals, a reproduction rule (reproduced prediction signal generators #1 through #N) for generating the reproduced prediction error signal. At this time, the selector 106 selects a reproduction rule that corresponds to the generation rule selected to generate encoded information. In the example illustrated in FIG. 6, encoded information generator #2 and reproduced prediction error signal generator #2 are selected.

A locally decoded picture generator 109 generates a locally decoded picture from the prediction signal generated by the prediction signal generator 103 and a reproduced prediction error signal generated by the reproduced prediction error signal generator 108. In other words, the locally decoded picture is obtained by decoding an encoding target picture that has already been encoded. A reference picture accumulator 110 collects and stores the locally decoded pictures as reference pictures to be used in a subsequent encoding process.

As has been described above, in the first embodiment, one of the encoded information generators #1 through #N and one of the reproduced prediction error signal generators #1 through #N are selected in accordance with a pixel position having concentrated prediction errors in a block so that the information amount of the encoded state of the prediction error signal is minimized. In this configuration, the encoded information generator 105 and the reproduced prediction error signal generator 108 are implemented by, for example, a plurality of types of orthogonal transform bases and inverse orthogonal transform bases that correspond to the pixel positions having concentrated prediction errors. The orthogonal transform may be, for example, a KL transform. Instead of the above, it is also possible to detect regions having large prediction errors and having small prediction errors so as to perform different orthogonal transforms on these two regions. Alternatively, it is also possible to perform DPCM on a region having large prediction errors and to perform orthogonal transform on a region having small prediction errors.

Figure 7:
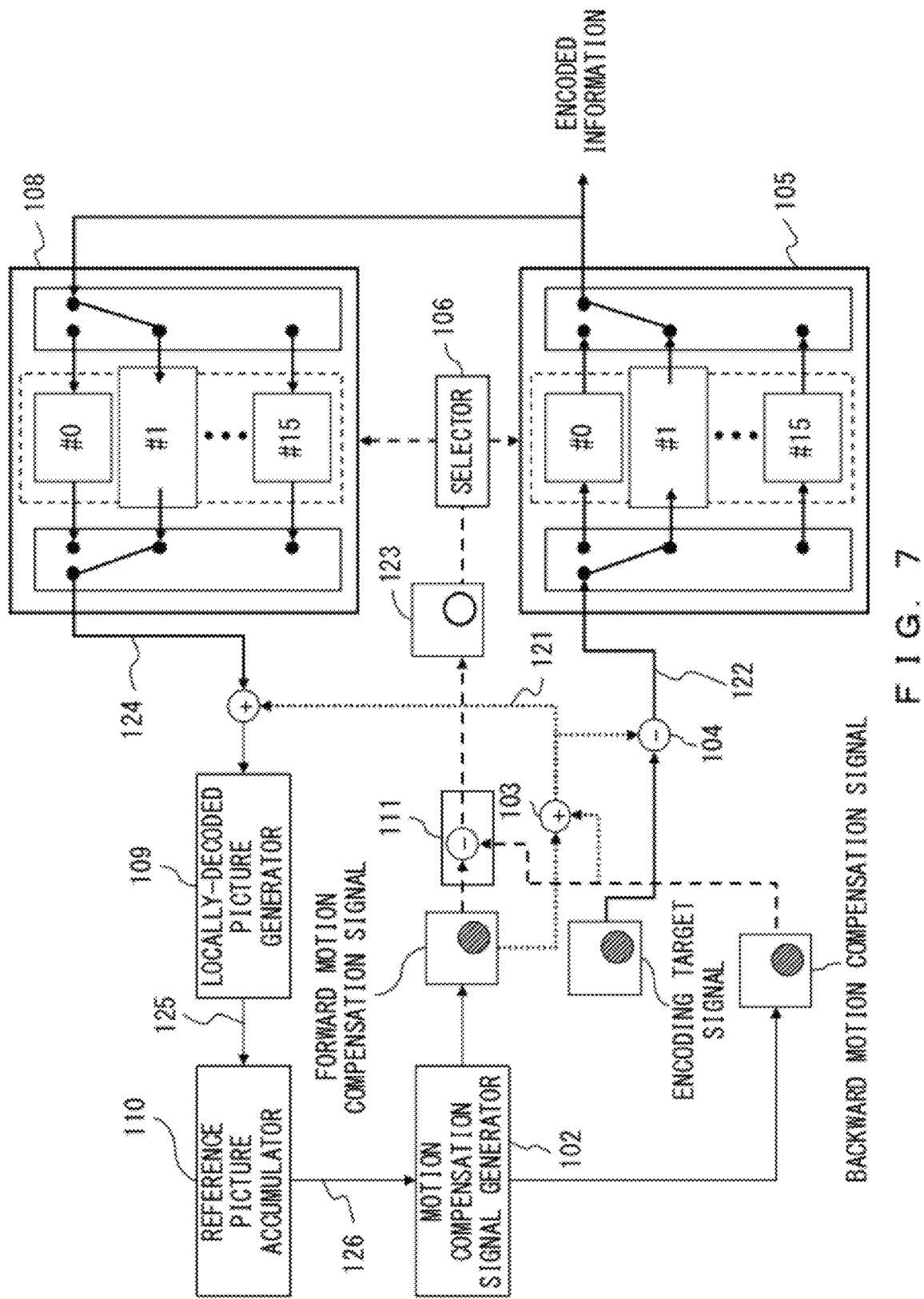
FIG. 7 illustrates an example of an operation of the encoder according to the first embodiment.

FIG. 7 illustrates an example of operations of an encoder according to the first embodiment. In this example, the encoded information generator 105 includes encoded information generators #0 through #15, and the reproduced prediction error signal generator 108 includes reproduced prediction error signal generators #0 through #15. Reproduced prediction error signal generators #0 through #15 perform the inverse processes of the processes performed by encoded information generators #0 through #15, respectively.

In the explanations, there is a circle texture in a lower right region in an encoding target block. It is also assumed that bi-directional prediction has been selected as a mode for encoding this encoding target block.

In such a case, the motion compensation signal generator 102 generates a forward motion compensation signal and a backward motion compensation signal with respect to the encoding target signal. Each picture block represented by the forward motion compensation signal and the backward motion compensation signal has a circle texture similarly to the encoding target block. However, the positions and/or the shapes of the texture existing in these three picture blocks are not necessarily the same as each other.

The prediction signal generator 103 generates a prediction signal 121 by calculating the average between the forward motion compensation signal and the backward motion compensation signal. The prediction error signal generator 104 calculates the difference between the encoding target signal and the prediction signal 121 in order to generate a prediction error signal 122. This prediction error signal 122 is transmitted to the encoded information generator 105.

Meanwhile, a difference calculator 111 generates an inter motion-compensation-signal difference signal 123 representing the difference between the forward motion compensation signal and the backward motion compensation signal. The difference calculator 111 may be included in the selector 106. When the forward motion compensation signal and the backward motion compensation signal compared, the two signals are roughly the same as each other in regions having no texture, however, there is a difference between the two signals in regions having the texture. Accordingly, in a block represented by the inter motion-compensation-signal difference signal 123, the difference value is large in a region having the texture (the lower right region in this example).

Similarly, when the encoded target signal and the prediction signal 121 are compared, the two signals are roughly the same as each other in a region having no texture, however, there is a difference between the two signals in a region having the texture. Thus, also in a block represented by the prediction error signal 122, a region having the texture (the lower right region in this example) involves a large error. In other words, there is a correlation between the prediction error signal 122 and the inter motion-compensation-signal difference signal 123.

The selector 106 selects an encoded information generator (#1 in this example) according to the inter motion-compensation-signal difference signal 123 from among encoded information generators #0 through #15. In the example illustrated in FIG. 7, an uneven pattern in which large components are located in the lower right region in the block is detected, and encoded information generator #1 is selected in accordance with the detected pattern. In this situation, the encoded information generator 105 uses encoded information generator #1 in order to generate encoded information from the prediction error signal 122.

The selector 106 selects, from among reproduced prediction error signal generators #0 through #15, a reproduced prediction error signal generator corresponding to the encoded information generator that has been selected. In this example, since encoded information generator #1 is selected in the encoded information generator 105, reproduced prediction error signal generator #1 is selected in the reproduction prediction error signal generator 108. Reproduced prediction error signal generator #1 performs the inverse process of a process performed by encoded information generator #1. When, for example, encoded information generator #1 performs an orthogonal transform, reproduced prediction error signal generator #1 performs the corresponding inverse orthogonal transform. The reproduced prediction error signal generator 108 uses reproduced prediction error signal generator #1 in order to generate a reproduced prediction error signal 124. Note that the method for generating a locally decoded picture 125 and a reference picture 126 from the reproduced prediction error signal 124 is as has already been described.

Figure 8:
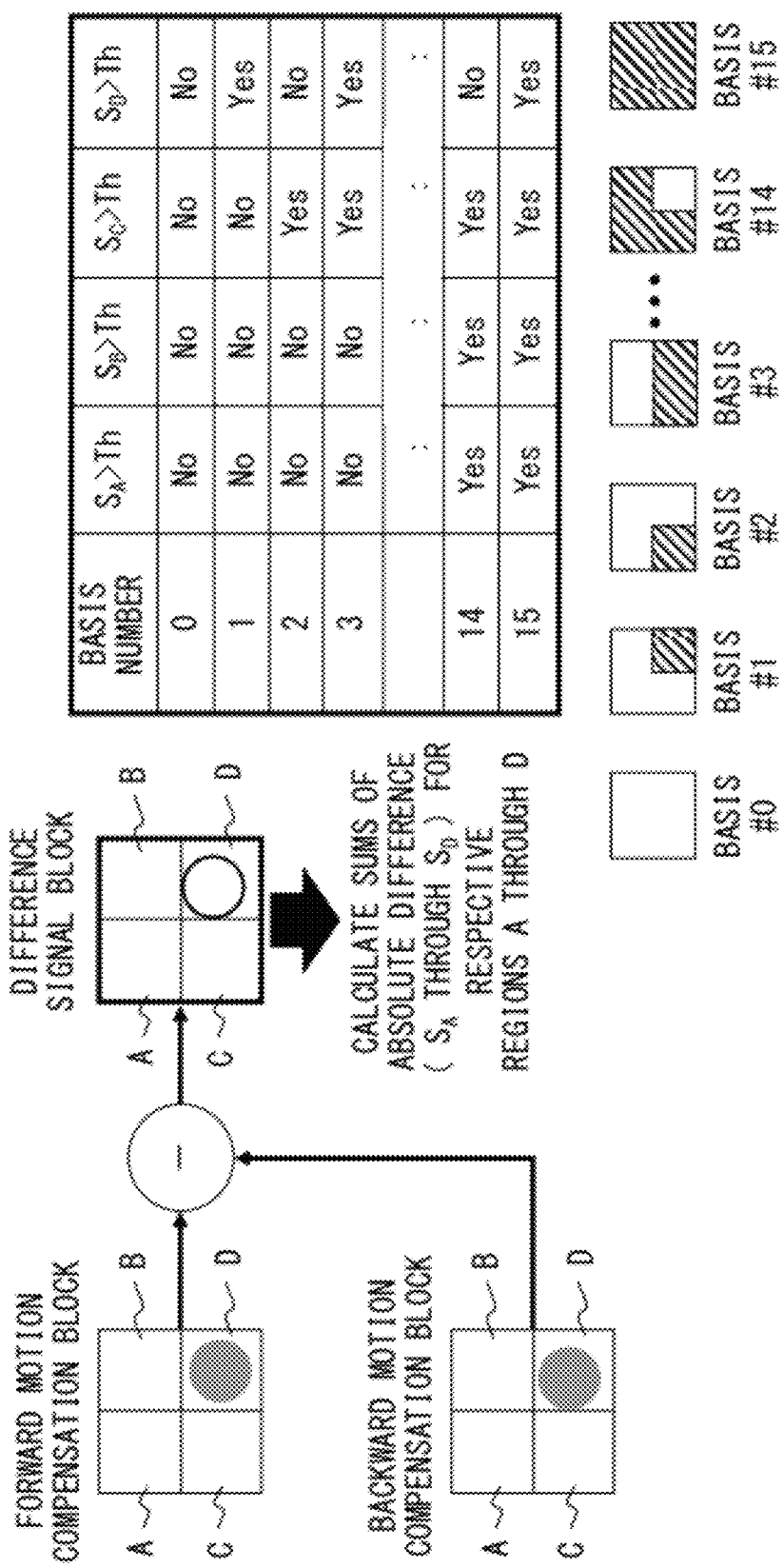
FIG. 8 illustrates an example of selecting a basis in accordance with an uneven pattern of differences.
Figure 9:
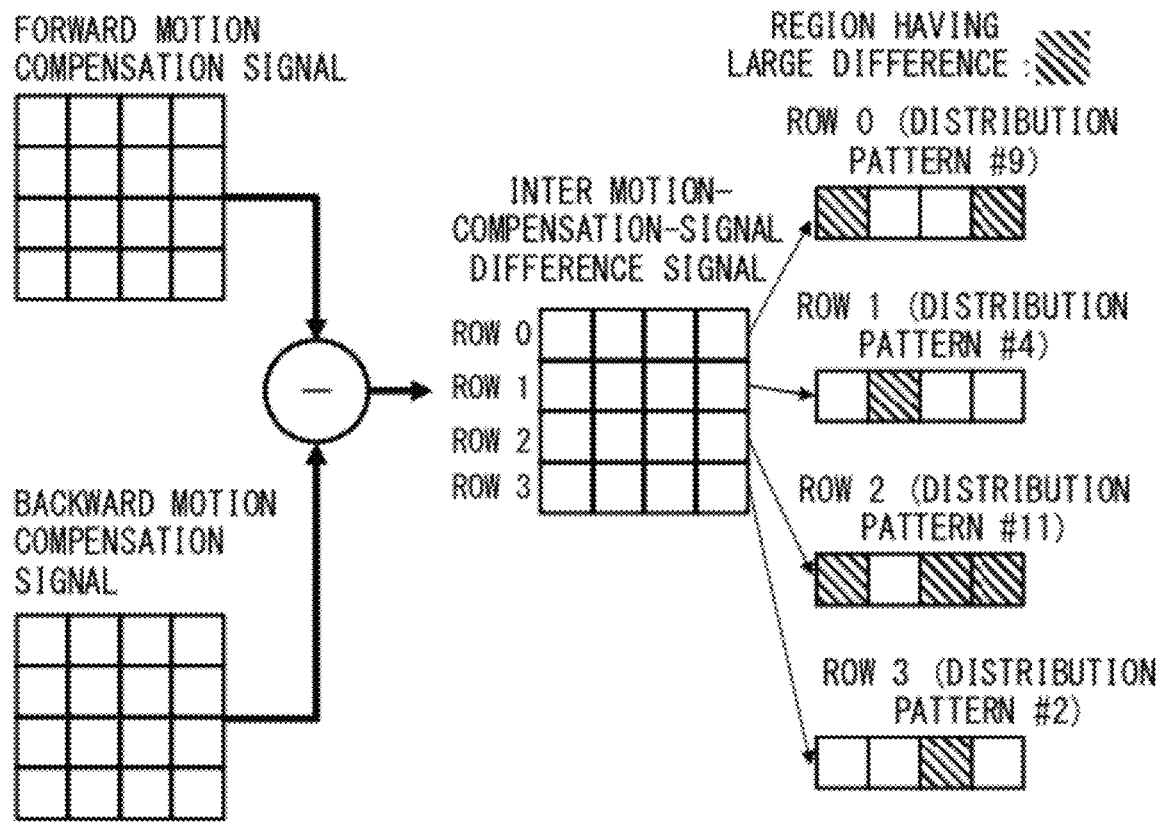

FIG. 8 explains a method of selecting an orthogonal transform basis in accordance with an uneven pattern of a difference between motion compensation signals. In this example, each block represented by a forward motion compensation signal, a backward motion compensation signal, and an inter motion-compensation-signal difference signal is divided into four regions (i.e., regions A through D). When for example, a block is 8×8 pixels in size, each of regions A through D is 4×4 pixels in size.

The inter motion-compensation-signal difference signal represents the difference between the pixel value (the luminance levels, for example) of each pixel of the forward motion compensation signal and the pixel value of the corresponding pixel of the backward motion compensation signal. The selector 106 calculates the sum of absolute difference for each of regions A through D represented by the inter motion-compensation-signal difference signal. Specifically, the selector 106 calculates sum of absolute difference ($S_A$ through $S_D$) for regions A through D, respectively.

Next, the selector 106 compares each sum of absolute difference ($S_A$ through $S_D$) with a threshold Th. This threshold Th may be a specified fixed value, or may be a value that varies adaptively during the execution of encoding processes. Thereafter, a combination pattern is detected based on the threshold decision for each sum of absolute difference ($S_A$ through $S_D$).

In the selector 106, bases #0 through #15 respectively corresponding to the combination patterns of the threshold decisions are prepared. A "basis" corresponds to a transform rule for orthogonal transform in this example. In this example, sixteen bases #0 through #15 different from each other are prepared. In FIG. 8, basis numbers "0" through "15" are expressed in the form of four-bit data corresponding to the results of four threshold decisions. In such a case, the data bit expresses "1" when the result of a threshold decision is "Yes", and the data bit expresses "0" when the result of a threshold decision is "No".

For example, basis #1 is a basis that results in a smaller information amount of encoded information when a prediction error is large only in a lower right region in a block and the prediction error signal is encoded after receiving an orthogonal transform using basis #1. Also, basis #2 is a basis that results in a smaller information amount of encoded information when a prediction error is large only in a lower left region and the prediction error signal is encoded after receiving an orthogonal transform using basis #2. The same principle is applied to the remaining bases; in other words, bases #0 through #15 are bases that result in smaller information amounts of encoded information in accordance with the distributions of pixels having large prediction errors. Additionally, optimum states are obtained in advance respectively for bases #0 through #15 in accordance with, for example, experiments or simulation.

In the example illustrated in FIG. 8, region D has a large difference. Specifically, only sum of absolute difference $S_D$ is larger than the threshold Th. In such a case, the selector 106 selects basis #1.

In this example, each of bases #0 through #15 is expressed in the form of a matrix corresponding to the size of the encoding target block. For example, when an encoding target block is 8×8 pixels in size, each of bases #0 through #15 is expressed in the form of a matrix of 64 elements (8 rows×8 columns).

The encoded information generator 105 stores bases #0 through #15. Bases #0 through #15 correspond to encoded information generator #0 through #15 illustrated in FIG. 7, respectively. The encoded information generator 105 uses the basis selected by the selector 106 in order to perform an orthogonal transform on a prediction error signal. In the above example, the encoded information generator 105 uses basis #1 in order to perform an orthogonal transform on the prediction error signal. In this example, an orthogonal transform is implemented by multiplying a matrix representing the prediction error signal by a matrix representing the selected basis. The orthogonally transformed prediction error signal undergoes quantization as necessary, and is output as encoded information.

As has been described above, in the example illustrated in FIG. 8, orthogonal transform bases are respectively prepared for specified uneven patterns of inter motion-compensation-signal difference signals. Prediction error signal is transformed by the basis that corresponds to the detected uneven pattern of the signal. When this transform is performed, a basis that reduces the information amount of the encoded information of the prediction error signal in the orthogonal transform is selected. Thus, the information amount of encoded information is reduced according to the encoding method of the first embodiment.

FIGS. 9-12 illustrate other examples of selecting a basis in accordance with the distribution pattern of a difference. In this example, a signal having a 4×4 block size is to be transformed.

Figure 10:
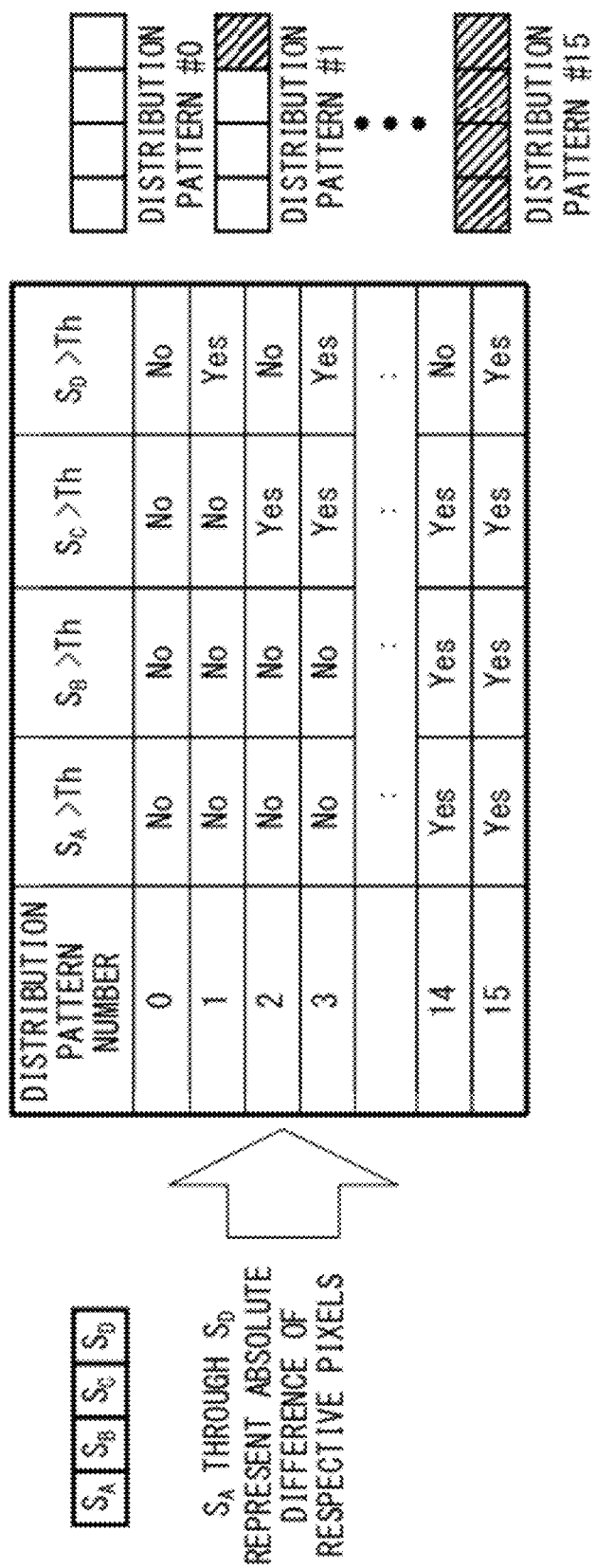

Also in this method, the difference between a forward motion compensation signal and a backward motion compensation signal is calculated, and thereby an inter motion-compensation-signal difference signal is generated. Next, a distribution pattern of difference values is detected for each row of the inter motion-compensation-signal difference signal. For example, absolute difference values $S_A$ through $S_D$ of respective pixels included in row 0 are calculated. Thereafter, as illustrated in FIG. 10, each of absolute difference values $S_A$ through $S_D$ is compared with threshold Th. The same comparison is performed for rows 1 through 3.

For example, in row 3, only absolute difference value $S_c$ of the second pixel counting from the right is larger than threshold Th, and absolute difference values $S_A$, $S_B$, and $S_D$ of the other pixels are smaller than threshold Th. In such a case, distribution pattern #2 is detected for row 3. Similarly, distribution patterns #9, #4, and #11 are detected for rows 0, 1, and 2, respectively.

Bases #0 through #15 are associated with distribution patterns #0 through 15, respectively. Each of bases #0 through #15 is determined so that when it is used for a "row" having its corresponding distribution pattern, energy concentrates on the first main component in the transformed "row".

The encoded information generator 105 uses the selected bases to transform respective rows of the prediction error signal and the inter motion-compensation-signal difference signal. In the above example, row 0 is transformed by using basis #9. Also, rows 1, 2, and 3 are transformed by using bases #4, #11, and #2, respectively. When the respective rows of the prediction error signal have been transformed by using the selected bases as described above, energy concentrates on the first main component in each of the rows.

Examples of bases #0 through #15 to be used for a row-direction transform are given below. In the following, each column of orthogonal transform bases represents a eigenvector. The first through fourth columns counting from the left represent the first main component, the second main component, the third main component, and the fourth main component of the eigenvector, respectively.

<Orthogonal Basis #0 (Basis Associated with Horizontal Distribution Pattern #0)>
0.417, 0.611, 0.589, 0.326
0.573, 0.340, −0.415, −0.620
0.570, −0.321, −0.418, 0.630
0.417, −0.639, 0.554, −0.335

<Orthogonal Basis #1>
0.211, 0.617, −0.608, −0.453
0.381, 0.561, 0.170, 0.715

0.599, 0.042, 0.624, −0.501
0.672, −0.550, −0.461, 0.183
<Orthogonal Basis #2>
0.310, 0.614, −0.583, 0.432
0.514, 0.469, 0.275, −0.664
0.635, −0.223, 0.504, 0.542
0.487, −0.594, −0.575, −0.281
<Orthogonal Basis #3>
0.254, 0.607, −0.623, −0.422
0.450, 0.522, 0.225, 0.689
0.630, −0.070, 0.554, −0.539
0.580, −0.595, −0.504, 0.237
<Orthogonal Basis #4>
0.468, −0.591, 0.590, −0.288
0.629, −0.258, −0.489, 0.547
0.526, 0.441, −0.299, −0.663
0.331, 0.625, 0.568, 0.421
<Orthogonal Basis #5>
0.305, 0.611, 0.632, 0.367
0.505, 0.482, −0.347, −0.626
0.614, −0.189, −0.467, 0.608
0.524, −0.599, 0.513, −0.322
<Orthogonal Basis #6>
0.355, 0.605, 0.607, −0.373
0.605, 0.377, −0.360, 0.602
0.608, −0.363, −0.366, −0.604
0.371, −0.600, 0.607, 0.367
<Orthogonal Basis #7>
0.358, 0.606, −0.635, −0.318
0.535, 0.413, 0.380, 0.631
0.591, −0.211, 0.450, −0.635
0.485, −0.646, −0.500, 0.312
<Orthogonal Basis #8>
0.647, −0.558, −0.487, 0.179
0.603, −0.000, 0.615, −0.508
0.406, 0.530, 0.196, 0.718
0.229, 0.638, −0.589, −0.440
<Orthogonal Basis #9>
0.428, 0.630, −0.576, 0.296
0.554, 0.322, 0.441, −0.629
0.559, −0.290, 0.431, 0.646
0.444, −0.645, −0.537, −0.315
<Orthogonal Basis #10>
0.497, −0.596, 0.549, −0.310
0.609, −0.232, −0.466, 0.599
0.523, 0.439, −0.356, −0.638
0.330, 0.630, 0.596, 0.372
<Orthogonal Basis #11>
0.461, −0.610, −0.577, 0.287
0.580, −0.285, 0.463, −0.607
0.549, 0.356, 0.385, 0.651
0.388, 0.648, −0.552, −0.355
<Orthogonal Basis #12>
0.564, −0.591, −0.529, 0.229
0.630, −0.102, 0.553, −0.536
0.460, 0.491, 0.244, 0.698
0.271, 0.632, −0.596, −0.415
<Orthogonal Basis #13>
0.394, 0.620, 0.584, 0.346
0.553, 0.370, −0.389, −0.637
0.574, −0.276, −0.461, 0.619
0.458, −0.634, 0.544, −0.302
<Orthogonal Basis #14>
0.484, −0.636, −0.525, 0.292
0.595, −0.216, 0.464, −0.620
0.532, 0.396, 0.371, 0.650
0.360, 0.626, −0.609, −0.328
<Orthogonal Basis #15>
0.456, 0.640, −0.554, −0.276
0.539, 0.295, 0.469, 0.634
0.539, −0.281, 0.446, −0.657
0.460, −0.651, −0.524, 0.300

Figure 12:
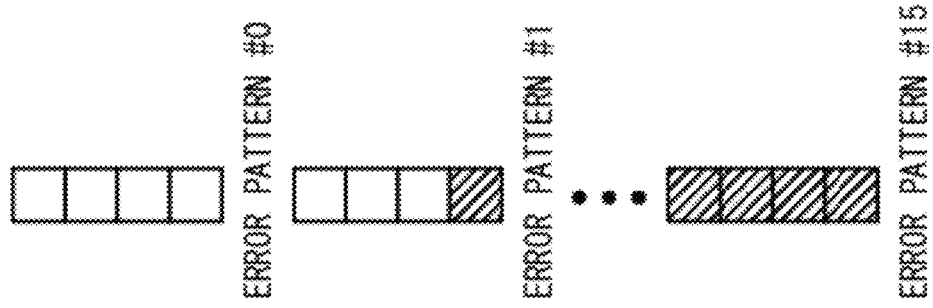
Figure 12:

When bases for respective columns are selected, sum of absolute difference ($S_E$ through $S_H$) are calculated for each row of the inter motion-compensation-signal difference signal as illustrated in FIGS. 11 and 12. $S_E$ is the sum of the absolute values of the respective components of row 0 of the inter motion-compensation-signal difference signal. Similarly, $S_F$, $S_G$, and $S_H$ are the sums of the absolute values of the respective components of rows 1, 2, and 3 of the inter motion-compensation-signal difference signal. Each of $S_E$ through $S_H$ is compared with threshold Th. It is now assumed, for example, that $S_E$ and $S_F$ are smaller than threshold Th, and $S_G$ and $S_H$ are larger than threshold Th. In such a case, basis pattern #3 is detected.

Basis sets #0 through #15 are associated with basis patterns #0 through #15, respectively. Each of basis sets #0 through #15 has four bases (orthogonal bases for the first through fourth main components). The orthogonal bases for the first through fourth main components are prepared so that they correspond to the first through fourth components of a basis transform matrix of 4×4 obtained by performing a basis transform in the row direction illustrated in FIGS. 9 and 10.

In the example illustrated in FIGS. 11 and 12, basis set #3 is selected. In such a case, the first component of the basis transform matrix of 4×4 is transformed by using the orthogonal basis for the first main component of basis set #3. Similarly, the second through fourth components of the basis transform matrix of 4×4 are transformed by using the orthogonal bases for the second through fourth main components of the basis set #3, respectively.

Each of basis sets #0 through #15 is determined so that when it is used for a "row" having its corresponding basis pattern, energy concentrates on the first element in the transformed "row". Accordingly, when each column of a prediction error signal after receiving a row-direction transform is transformed by using a basis set selected in the manner described above, energy concentrates on the first element in each column. In other words, when an orthogonal transform is performed in the row direction and the column direction, energy concentrates on a low-frequency component region.

Examples of basis sets #0 through #15 used for performing column-direction transform are given below. In the following, each column of orthogonal transform bases represents an eigenvector. The first through fourth columns counting from the left represent the first main component, the second main component, the third main component, and the fourth main component of the eigenvector, respectively. Note that values of the first through the fourth components tend to be in descending order with the first component having the largest value in a transformed matrix. At this stage, an orthogonal transform is performed in the horizontal direction on each row of an encode target signal in the real space so that main components are arranged in the same manner for all rows. Thereby, in this matrix, the main components with the same rank in the respective rows are aligned in the column direction. Basis sets according to the embodiments have bases in the horizontal direction for each of the main components.

<Basis Set #0 (Basis Set Associated with Vertical-Direction Basis Pattern #0)>
Orthogonal Basis for First Main Component
0.397, −0.596, 0.614, 0.333
0.592, −0.345, −0.381, −0.621
0.580, 0.316, −0.410, 0.629
0.394, 0.653, 0.557, −0.329
Orthogonal Basis for Second Main Component
0.397, −0.619, 0.615, 0.284
0.590, −0.305, −0.393, −0.637
0.580, 0.272, −0.402, 0.655
0.399, 0.671, 0.553, −0.292
Orthogonal Basis for Third Main Component
0.462, 0.556, −0.510, 0.465
0.529, 0.444, 0.439, −0.574
0.529, −0.431, 0.498, 0.535
0.476, −0.555, −0.546, −0.408
Orthogonal Basis for Fourth Main Component
0.430, 0.621, 0.518, −0.401
0.542, 0.379, −0.430, 0.614
0.566, −0.388, −0.448, −0.574
0.448, −0.565, 0.588, 0.365
<Basis Set #1>
Orthogonal Basis for First Main Component
0.187, 0.589, −0.646, −0.448
0.346, 0.600, 0.159, 0.703
0.574, 0.110, 0.625, −0.517
0.718, −0.530, −0.408, 0.191
Orthogonal Basis for Second Main Component
0.201, 0.538, −0.613, 0.542
0.368, 0.596, 0.013, −0.714
0.576, 0.138, 0.685, 0.425
0.702, −0.580, −0.393, −0.129
Orthogonal Basis for Third Main Component
0.229, 0.599, −0.308, 0.702
0.321, 0.632, −0.117, −0.695
0.600, 0.002, 0.787, 0.147
0.696, −0.491, −0.522, −0.037
Orthogonal Basis for Fourth Main Component
0.142, 0.432, −0.573, 0.682
0.257, 0.555, −0.357, −0.705
0.590, 0.401, 0.674, 0.190
0.752, −0.587, −0.299, −0.036
<Basis Set #2>
Orthogonal Basis for First Main Component
0.286, 0.603, 0.615, −0.420
0.526, 0.478, −0.270, 0.650
0.657, −0.230, −0.458, −0.553
0.458, −0.596, 0.582, 0.310
Orthogonal Basis for Second Main Component
0.355, −0.587, −0.488, 0.540
0.569, −0.395, 0.101, −0.714
0.603, 0.245, 0.624, 0.433
0.432, 0.663, −0.602, −0.108
Orthogonal Basis for Third Main Component
0.426, 0.551, 0.064, 0.715
0.523, 0.497, −0.029, −0.692
0.540, −0.468, −0.692, 0.101
0.503, −0.480, 0.718, 0.006
Orthogonal Basis for Fourth Main Component
0.308, 0.656, 0.124, 0.677
0.449, 0.533, −0.019, −0.717
0.689, −0.381, −0.595, 0.164
0.479, −0.374, 0.794, −0.000

<Basis Set #3>
Orthogonal Basis for First Main Component
0.264, 0.589, −0.648, −0.404
0.458, 0.523, 0.240, 0.678
0.621, −0.066, 0.543, −0.561
0.578, −0.612, −0.477, 0.251
Orthogonal Basis for Second Main Component
0.191, 0.579, −0.664, −0.434
0.395, 0.598, 0.200, 0.668
0.618, 0.022, 0.559, −0.553
0.652, −0.554, −0.456, 0.246
Orthogonal Basis for Third Main Component
0.204, 0.645, −0.517, 0.524
0.334, 0.644, 0.311, −0.615
0.654, −0.149, 0.562, 0.484
0.647, −0.384, −0.565, −0.337
Orthogonal Basis for Fourth Main Component
0.121, 0.510, 0.485, 0.700
0.282, 0.625, 0.255, −0.682
0.705, 0.174, −0.656, 0.206
0.639, −0.564, 0.519, −0.059
<Basis Set #4>
Orthogonal Basis for First Main Component
0.442, −0.542, 0.644, 0.310
0.658, −0.281, −0.421, −0.558
0.528, 0.417, −0.330, 0.662
0.304, 0.673, 0.547, −0.394
Orthogonal Basis for Second Main Component
0.421, −0.596, 0.673, 0.118
0.612, −0.306, −0.575, −0.449
0.560, 0.356, −0.163, 0.730
0.367, 0.651, 0.435, −0.502
Orthogonal Basis for Third Main Component
0.457, 0.512, 0.727, 0.002
0.512, 0.511, −0.682, 0.110
0.557, −0.451, −0.032, −0.697
0.467, −0.523, 0.072, 0.709
Orthogonal Basis for Fourth Main Component
0.493, −0.595, −0.634, −0.029
0.565, −0.326, 0.737, 0.180
0.547, 0.516, −0.030, −0.658
0.373, 0.522, −0.234, 0.730
<Basis Set #5>
Orthogonal Basis for First Main Component
0.322, 0.556, 0.670, 0.372
0.524, 0.486, −0.306, −0.629
0.597, −0.163, −0.492, 0.612
0.514, −0.654, 0.465, −0.303
Orthogonal Basis for Second Main Component
0.339, −0.474, 0.600, −0.548
0.548, −0.452, −0.024, 0.703
0.591, 0.073, −0.675, −0.437
0.486, 0.752, 0.429, 0.120
Orthogonal Basis for Third Main Component
0.339, 0.560, −0.187, 0.732
0.486, 0.562, −0.051, −0.668
0.587, −0.280, 0.748, 0.134
0.552, −0.540, −0.635, −0.004
Orthogonal Basis for Fourth Main Component
0.281, 0.537, −0.499, −0.619
0.338, 0.568, −0.117, 0.741
0.685, 0.026, 0.693, −0.224
0.580, −0.623, −0.508, 0.132
<Basis Set #6>
Orthogonal Basis for First Main Component
0.335, −0.551, 0.659, 0.387
0.625, −0.407, −0.313, −0.588

0.617, 0.362, −0.362, 0.598
0.341, 0.632, 0.581, −0.384
Orthogonal Basis for Second Main Component
0.320, −0.524, 0.681, 0.400
0.645, −0.374, −0.221, −0.629
0.622, 0.311, −0.403, 0.595
0.308, 0.699, 0.571, −0.301
Orthogonal Basis for Third Main Component
0.348, 0.553, 0.569, 0.499
0.583, 0.481, −0.328, −0.566
0.616, −0.424, −0.417, 0.516
0.399, −0.532, 0.628, −0.405
Orthogonal Basis for Fourth Main Component
0.301, 0.648, 0.483, −0.506
0.513, 0.476, −0.261, 0.665
0.745, −0.418, −0.327, −0.404
0.302, −0.423, 0.769, 0.371
　　<Basis Set #7>
Orthogonal Basis for First Main Component
0.368, 0.569, −0.656, −0.332
0.547, 0.418, 0.348, 0.636
0.590, −0.208, 0.466, −0.626
0.466, −0.676, −0.481, 0.307
Orthogonal Basis for Second Main Component
0.285, 0.580, −0.670, −0.365
0.508, 0.483, 0.276, 0.657
0.617, −0.111, 0.494, −0.603
0.529, −0.646, −0.480, 0.268
Orthogonal Basis for Third Main Component
0.322, 0.648, −0.606, 0.330
0.464, 0.503, 0.491, −0.539
0.611, −0.263, 0.390, 0.636
0.554, −0.508, −0.489, −0.442
Orthogonal Basis for Fourth Main Component
0.251, 0.633, 0.535, −0.499
0.463, 0.500, −0.140, 0.718
0.651, −0.115, −0.596, −0.456
0.546, −0.579, 0.583, 0.165
　　<Basis Set #8>
Orthogonal Basis for First Main Component
0.684, −0.537, −0.457, 0.186
0.591, 0.046, 0.622, −0.512
0.373, 0.560, 0.192, 0.714
0.209, 0.629, −0.606, −0.439
Orthogonal Basis for Second Main Component
0.655, −0.621, −0.415, −0.112
0.596, 0.099, 0.679, 0.417
0.400, 0.542, 0.022, −0.739
0.234, 0.558, −0.605, 0.518
Orthogonal Basis for Third Main Component
0.699, −0.493, −0.516, −0.041
0.598, 0.012, 0.787, 0.149
0.314, 0.626, −0.115, −0.704
0.233, 0.604, −0.317, 0.693
Orthogonal Basis for Fourth Main Component
0.863, −0.444, −0.238, −0.034
0.452, 0.470, 0.738, 0.172
0.195, 0.624, −0.362, −0.664
0.112, 0.438, −0.517, 0.727
　　<Basis Set #9>
Orthogonal Basis for First Main Component
0.421, 0.631, −0.580, 0.299
0.541, 0.342, 0.442, −0.628
0.557, −0.269, 0.446, 0.647
0.468, −0.643, −0.520, −0.312

Orthogonal Basis for Second Main Component
0.410, 0.599, −0.592, 0.350
0.541, 0.400, 0.422, −0.607
0.557, −0.290, 0.462, 0.626
0.478, −0.629, −0.508, −0.342
Orthogonal Basis for Third Main Component
0.464, 0.594, −0.520, 0.402
0.510, 0.416, 0.486, −0.576
0.528, −0.393, 0.474, 0.585
0.495, −0.566, −0.519, −0.407
Orthogonal Basis for Fourth Main Component
0.507, −0.669, −0.392, −0.376
0.481, −0.290, 0.455, 0.691
0.547, 0.423, 0.492, −0.528
0.460, 0.537, −0.630, 0.320
　　<Basis Set #10>
Orthogonal Basis for First Main Component
0.467, −0.631, 0.541, −0.303
0.601, −0.242, −0.462, 0.605
0.545, 0.414, −0.347, −0.641
0.351, 0.610, 0.611, 0.362
Orthogonal Basis for Second Main Component
0.459, −0.668, 0.564, 0.161
0.609, −0.196, −0.585, −0.499
0.541, 0.391, −0.184, 0.722
0.356, 0.602, 0.554, −0.452
Orthogonal Basis for Third Main Component
0.544, −0.598, −0.584, −0.080
0.563, −0.258, 0.767, 0.168
0.491, 0.561, −0.026, −0.666
0.382, 0.511, −0.266, 0.722
Orthogonal Basis for Fourth Main Component
0.817, −0.442, −0.323, −0.183
0.479, 0.198, 0.834, 0.189
0.243, 0.812, −0.224, −0.481
0.210, 0.325, −0.388, 0.836
　　<Basis Set #11>
Orthogonal Basis for First Main Component
0.429, 0.636, −0.569, 0.295
0.552, 0.324, 0.459, −0.617
0.563, −0.311, 0.411, 0.646
0.441, −0.627, −0.545, −0.340
Orthogonal Basis for Second Main Component
0.349, 0.652, −0.667, 0.093
0.519, 0.427, 0.637, −0.378
0.593, −0.277, 0.143, 0.743
0.507, −0.562, −0.360, −0.545
Orthogonal Basis for Third Main Component
0.380, 0.634, −0.666, 0.102
0.448, 0.504, 0.700, −0.234
0.596, −0.354, 0.113, 0.712
0.548, −0.467, −0.233, −0.654
Orthogonal Basis for Fourth Main Component
0.369, 0.781, −0.431, −0.261
0.407, 0.351, 0.717, 0.443
0.635, −0.390, 0.219, −0.630
0.543, −0.339, −0.501, 0.582
　　<Basis Set #12>
Orthogonal Basis for First Main Component
0.561, −0.586, −0.531, 0.247
0.626, −0.117, 0.533, −0.556
0.466, 0.485, 0.277, 0.687
0.276, 0.639, −0.598, −0.397

Orthogonal Basis for Second Main Component
0.616, −0.554, −0.514, 0.224
0.634, −0.037, 0.576, −0.515
0.414, 0.556, 0.198, 0.692
0.217, 0.618, −0.605, −0.453
Orthogonal Basis for Third Main Component
0.641, −0.388, −0.555, −0.361
0.653, −0.163, 0.542, 0.503
0.341, 0.639, 0.338, −0.601
0.213, 0.644, −0.533, 0.506
Orthogonal Basis for Fourth Main Component
0.734, −0.517, −0.440, −0.032
0.604, 0.212, 0.747, 0.180
0.285, 0.677, −0.273, −0.622
0.121, 0.480, −0.417, 0.762
  <Basis Set #13>
Orthogonal Basis for First Main Component
0.412, 0.604, 0.598, 0.330
0.552, 0.367, −0.403, −0.631
0.558, −0.264, −0.468, 0.633
0.463, −0.657, 0.512, −0.304
Orthogonal Basis for Second Main Component
0.484, −0.510, −0.418, 0.575
0.599, −0.331, 0.106, −0.721
0.513, 0.338, 0.695, 0.373
0.379, 0.718, −0.575, −0.100
Orthogonal Basis for Third Main Component
0.523, −0.504, −0.241, −0.644
0.578, −0.370, 0.105, 0.720
0.476, 0.468, 0.704, −0.243
0.408, 0.624, −0.660, 0.090
Orthogonal Basis for Fourth Main Component
0.558, −0.513, 0.341, −0.556
0.561, −0.324, −0.212, 0.732
0.500, 0.501, −0.619, −0.341
0.353, 0.617, 0.675, 0.198
  <Basis Set #14>
Orthogonal Basis for First Main Component
0.449, −0.650, −0.536, 0.297
0.588, −0.255, 0.461, −0.615
0.553, 0.377, 0.365, 0.647
0.383, 0.609, −0.606, −0.340
Orthogonal Basis for Second Main Component
0.518, −0.578, −0.538, 0.331
0.625, −0.198, 0.436, −0.616
0.503, 0.461, 0.375, 0.628
0.297, 0.644, −0.617, −0.342
Orthogonal Basis for Third Main Component
0.545, −0.511, 0.472, −0.469
0.609, −0.279, −0.361, 0.649
0.473, 0.502, −0.512, −0.513
0.330, 0.640, 0.620, 0.311
Orthogonal Basis for Fourth Main Component
0.589, −0.593, −0.504, −0.217
0.609, −0.093, 0.602, 0.508
0.474, 0.575, 0.157, −0.649
0.240, 0.556, −0.599, 0.523
  <Basis Set #15>
Orthogonal Basis for First Main Component
0.440, 0.635, −0.565, −0.289
0.539, 0.318, 0.453, 0.635
0.547, −0.273, 0.451, −0.650
0.465, −0.649, −0.521, 0.302
Orthogonal Basis for Second Main Component
0.429, 0.621, 0.572, 0.320
0.553, 0.334, −0.420, −0.638
0.556, −0.289, −0.457, 0.632
0.449, −0.648, 0.536, −0.303
Orthogonal Basis for Third Main Component
0.457, 0.597, 0.536, 0.384
0.533, 0.388, −0.456, −0.599
0.536, −0.371, −0.470, 0.595
0.469, −0.596, 0.533, −0.375
Orthogonal Basis for Fourth Main Component
0.441, 0.636, 0.531, −0.345
0.545, 0.327, −0.426, 0.644
0.554, −0.329, −0.463, −0.609
0.448, −0.617, 0.568, 0.309

Note that while pattern selection and transforms of prediction error signals are performed in row-direction processes and then pattern selection and transforms of prediction error signals are performed in column-direction processes in the above explanation, the encoding method according to the first embodiment is not limited to this explanation. In other words, it is also possible, for example, to perform a row-direction transform process and a column-direction transform process after performing a row-direction pattern selection process and a column-direction pattern selection process.

In the method illustrated in FIGS. 9 through 12, a transform is performed in the row direction and the column direction respectively, and thus energy concentrates on low frequency components similarly to a case of a discrete cosine transform. Further, since bases are selected appropriately in accordance with the distribution of difference values of inter motion-compensation-signal difference signals, it is possible to reduce the spatial redundancies in comparison with a case where a discrete cosine transform employed by H.264/MPEG-4 AVC and the like is performed.

FIG. 13 illustrates a configuration of the decoder according to the first embodiment. The decoder according to the first embodiment decodes encoded data generated by the encoder illustrated in FIG. 6. This encoded data stream contains encoded information, a reference picture index, and motion vector information generated by the encoded information generator 105. In addition, encoded information is processed as a decoding target signal representing a decoding target block in the decoder.

The decoder performs substantially the inverse process of a process performed by the encoder. Also, the decoder performs a decoding process for each block.

An entropy decoder 151 performs entropy decoding on an encoded data stream, and reproduces encoded information, motion vector information, and the like. In FIG. 13, an inverse zigzag scanner is omitted.

A motion compensation signal generator 152 generates a plurality of motion compensation signals in accordance with motion vector information received from the encoder and a plurality of reference pictures. In this example, as explained by referring to FIGS. 3 and 4, forward motion compensation signal and backward motion compensation signal are generated. The reference picture is a picture that has already been decoded and stored in a reference picture accumulator 157, and is substantially the same as the reference picture used in the encoder. Accordingly, substantially the same motion compensation signals are generated in the encoder and the decoder.

A prediction signal generator 153 generates a prediction signal representing a predicted value of a decoded picture by using the plurality of motion compensation signals. In other words, by calculating the average between forward motion compensation signal and backward motion compensation signal, the prediction signal is generated.

A selector 154 selects, from among a plurality of reproduction rules to be used for generating reproduced prediction error signals from decoding target signals, a reproduction rule that is determined in accordance with the plurality of motion compensation signals obtained by the motion compensation signal generator 152. In this example, a reproduction rule is selected in accordance with the difference between the forward motion compensation signal and the backward motion compensation signal.

A reproduction prediction error signal generators 155 includes a plurality of reproduced prediction error signal generators #1 through #N. Reproduced prediction error signal generators #1 through #N generate reproduced prediction error signals from decoding target signal based on reproduction rules #1 through #N, respectively. Reproduction rules #1 through #N define the inverse processes of processes performed in accordance with production rules #1 through #N in the encoder, respectively. The reproduced prediction error signal generator 155 generates a reproduced prediction error signal from a decoding target signal in accordance with the reproduction rule selected by the selector 154.

A decoded picture generator 156 generates a decoded picture from the reproduced prediction error signal and the prediction signal. The decoded picture is stored in the reference picture accumulator 157 as a reference picture to be used in a subsequent decoding process.

Configurations and operations of the motion compensation signal generator 152, the prediction signal generator 153, the selector 154, and the reproduced prediction error signal generator 155 are substantially the same as those of the motion compensation signal generator 102, the prediction signal generator 103, the selector 106, and the reproduced prediction error signal generator 108 illustrated in FIG. 6. Specifically, similar motion compensation signals are generated from similar reference pictures both in the encoder and the decoder. Thus, the encoder and the decoder are capable of estimating, in a similar manner, the distribution of prediction error signals from the distribution of differences between motion compensation signals. Accordingly, when the encoder adaptively selects encoding scheme in accordance with distributions of differences between motion compensation signals, the decoder can select, in accordance with the distribution of the difference between the motion compensation signals and without receiving a dedicated notification from the encoder, a decoding scheme that corresponds to the encoding scheme employed by the encoder.

Figure 14:
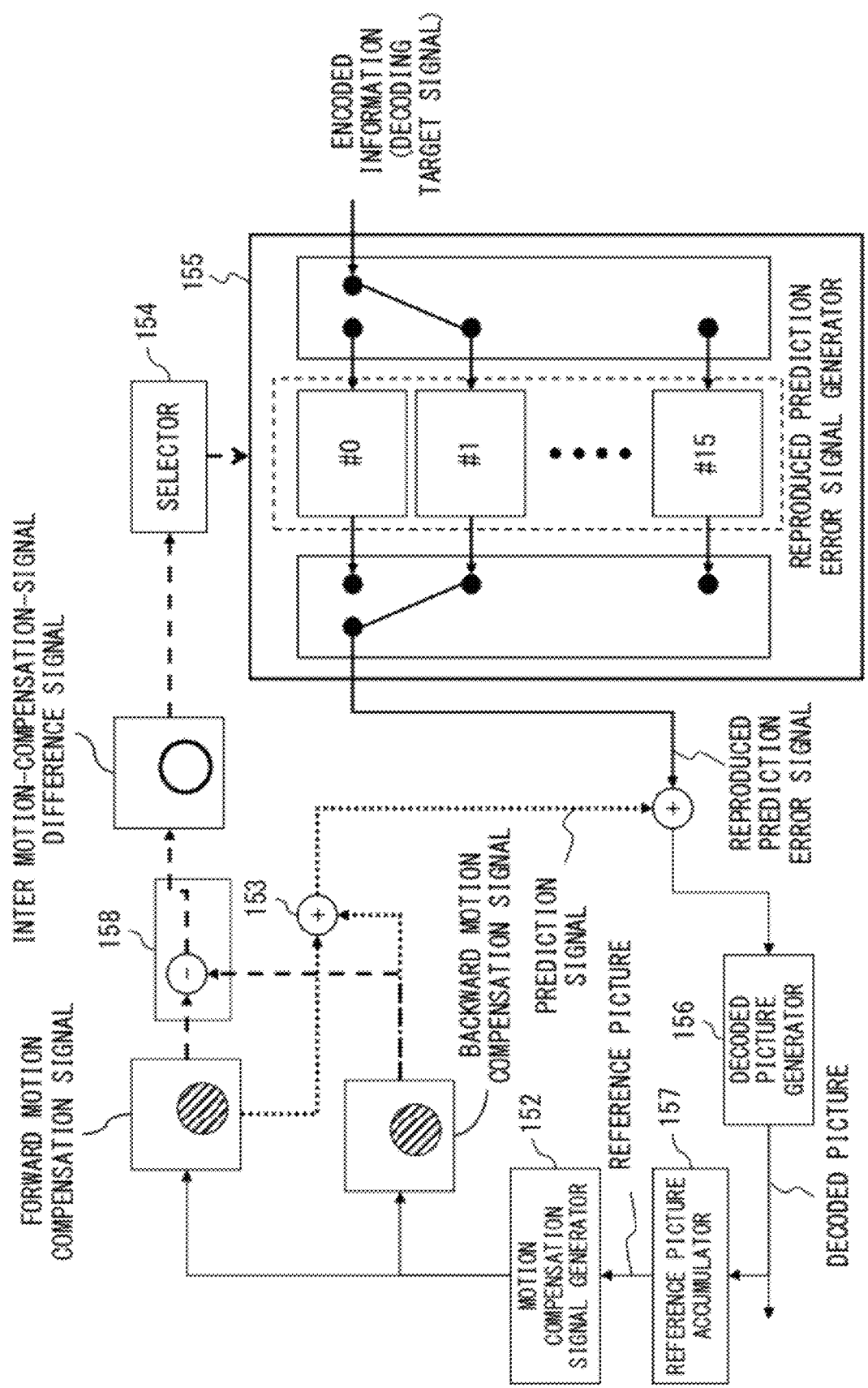
FIG. 14 illustrates an example of an operation of the decoder according to the first embodiment.

FIG. 14 illustrates an example of operations of a decoder according to the first embodiment. Operations of the decoder are substantially the same as the encoder explained by referring to FIG. 7. Specifically, an inter motion-compensation-signal difference signal is generated by calculating the difference between a forward motion compensation signal and a backward motion compensation signal. This calculation is executed by a difference calculator 158. The difference calculator 158 may be implemented as part of the selector 154.

The selector 154 detects a distribution pattern of inter motion-compensation-signal difference signals. In this example, difference values are large in the lower right region in a block. The selector 154 selects a basis that corresponds to the above distribution pattern from among a plurality of bases (reproduced prediction error signal generators #0 through #15) provided by the reproduced prediction error signal generator 155. The same method as is employed by the encoder is employed for selecting a basis in accordance with distribution patterns, as was explained by referring to FIG. 8, or FIGS. 9 through 12.

The reproduced prediction error signal generators 155 generates a reproduced prediction error signal by transforming encoded information (decoding target signal) using the basis selected by the selector 154. During this process, an inverse transform of an orthogonal transform performed by the encoded information generator 105 of the encoder is performed. Thereafter, a decoded picture is generated by using the reproduced prediction error signal and the prediction signal.

Figure 15:
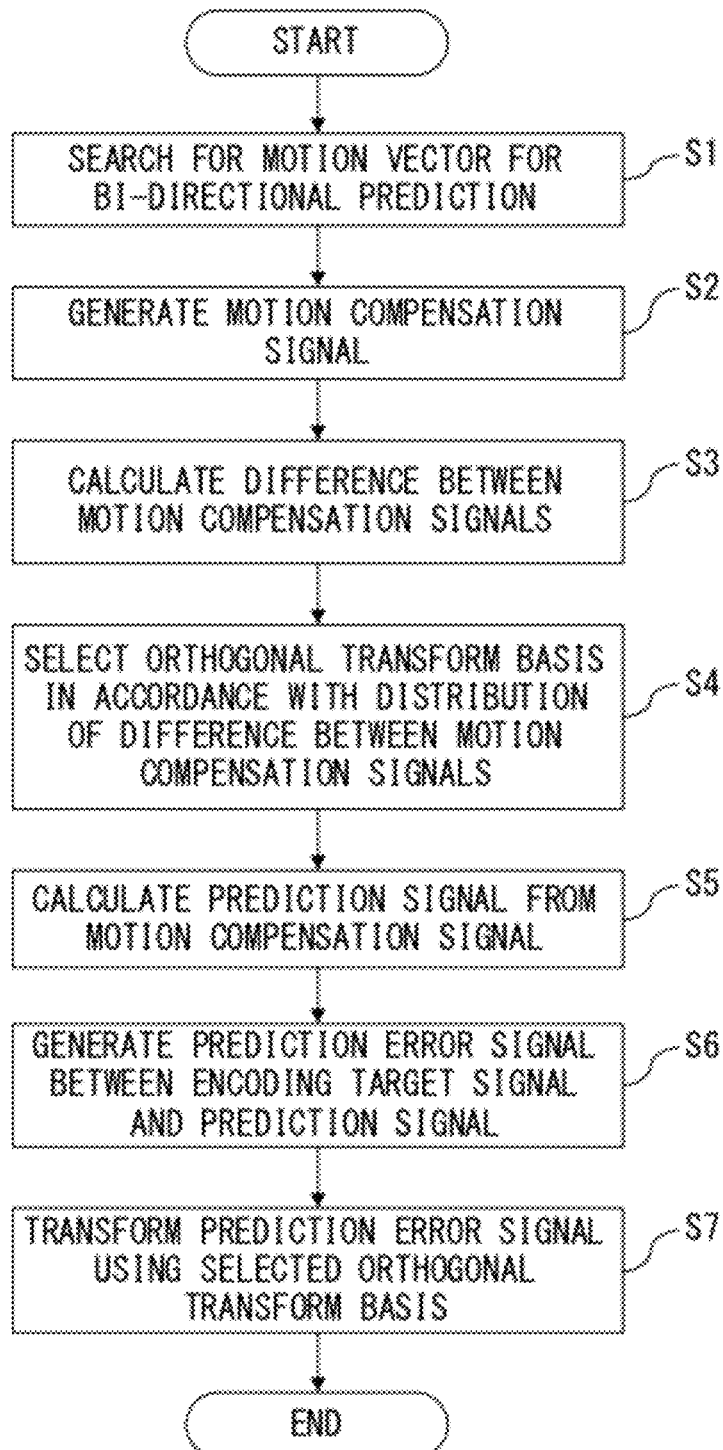
FIG. 15 is a flowchart indicating an encoding method according to the first embodiment.

FIG. 15 is a flowchart indicating the encoding method according to the first embodiment. The encoding method of this flowchart is executed by, for example, the encoder illustrated in FIG. 6. The encoder executes the process of this flowchart for each encoding target block.

In step S1, the motion estimator 101 searches for the motion vectors for bi-directional prediction. Thereby, a forward motion vector and a backward motion vector are detected. In step S2, the motion compensation signal generator 102 generates motion compensation signals from the forward motion vector and the backward motion vector. Thereby, a forward motion compensation signal and a backward motion compensation signal are generated. In step S3, the selector 106 (or the difference calculator 111) calculates the difference between the compensation signals. Specifically, an inter motion-compensation-signal difference signal representing the difference between the forward motion compensation signal and the backward motion compensation signal is generated.

In step S4, the selector 106 selects an orthogonal transform basis in accordance with the inter motion-compensation-signal difference signal (i.e., in accordance with the distribution of the differences between the forward motion compensation signal and the backward motion compensation signal). In step S5, the prediction signal generator 103 generates a prediction signal from the forward motion compensation signal and the backward motion compensation signal. In step S6, the prediction error signal generator 104 generates a prediction error signal representing the difference between an encoding target signal and the prediction signal.

In step S7, the encoded information generator 105 transforms the prediction error signal in accordance with the selected orthogonal transform basis. Thereafter, a quantization process and entropy encoding are performed on the transformed prediction error signal, which has been omitted in FIG. 15.

Note that, in the flowchart of FIG. 15, steps S5 and S6 may be executed before step S3. Additionally, steps S3 and S4 may be executed in parallel with steps S5 and S6.

FIG. 16 is a flowchart indicating a decoding method according to the first embodiment. The decoding method of this flowchart is executed by, for example, the decoder illustrated in FIG. 13. The decoder executes the process in this flowchart for each decoding target block.

In step S11, the entropy decoder 151 performs entropy decoding on encoded information (a decoding target signal). Further, an inverse quantization process is performed on an output signal from the entropy decoder 151. In step S12, the motion compensation signal generator 152 generates a motion compensation signal. In step S13, the selector 154 (or the difference calculator 158) calculates the difference between motion compensation signals. The processes of steps S12 and S13 are substantially the same as those of steps S2 and S3 executed by the encoder.

In step S14, the selector 154 selects an inverse orthogonal transform basis in accordance with the inter motion-compensation-signal difference signal (i.e., in accordance with the distribution of the difference between forward motion compensation signal and backward motion compensation signal). In step S15, the prediction signal generator 153 generates a prediction signal from the forward motion compensation signal and the backward motion compensation signal.

In step S16, the reproduced prediction error signal generator 155 transforms the decoding target signal by using the selected inverse orthogonal transform basis, and thereby generates a reproduced prediction error signal. In step S17, the decoded picture generator 156 adds the reproduced prediction error signal to the prediction signal, and thereby generates a decoded picture.

Note that, in the flowchart of FIG. 16, step S15 may be executed before step S13. Also, steps S13 and S14 may be executed in parallel with step S15.

As has been described above, the video encoding/decoding method according to the first embodiment utilizes the correlation between the distribution of difference values between a plurality of motion compensation signals and the distribution of prediction error signals. In other words, a scheme of encoding/decoding a prediction error signal is appropriately selected in accordance with the distribution of difference values between motion compensation signals.

Accordingly, spatial redundancies of a prediction error is efficiently reduced, and thus the information amount of encoded information is reduced compared with conventional methods (for example, a method employing a DCT transform regardless of picture characteristics). Also, since the encoder and the decoder generate substantially the same motion compensation signals, the decoder can correctly select a corresponding decoding scheme without receiving information specifying an encoding method from the encoder. Further, since an appropriate encoding scheme (transform rules in this example) in accordance with picture characteristics is selected, the information amount of encoded information is reduced even when the block involves a large prediction error (for example, a region having fine textures or a scene involving sharp movements).

Second Embodiment

The applicants of the present patent application have found that if prediction error of luminance information of a pixel is large, prediction error of color difference information of the pixel is also large, when the luminance information and the color difference information are encoded. This means that there are correlations between the position of a pixel with a prediction error of luminance information and the position of a pixel with a prediction error of color difference information. These correlations exist regardless of which prediction signal generation method is employed from among inter prediction, bi-directional inter-frame prediction, and intra prediction. Further, these correlations also exist between R components, G components, and B components of an RGB signal.

Using the above correlations makes it possible to estimate the distribution or the unevenness of positions involving prediction errors of luminance information from positions involving prediction errors of color difference information. Accordingly, in a second embodiment, an encoding scheme for luminance information is selected in accordance with the pixel positions of prediction errors of color difference information in order to increase the efficiency in encoding luminance information. In view of the fact that the information amount of luminance information is at least several times that of color difference information, an increase in the efficiency in encoding luminance information greatly contributes to an increase in the efficiency in encoding an entire picture.

In the first embodiment, an encoding scheme for encoding an encoding target signal (a basis for orthogonal transform in the above example) is appropriately selected in accordance with the distribution of the differences between a plurality of motion compensation signals. By contrast, in the second embodiment, an encoding scheme for encoding luminance information is appropriately selected in accordance with the distribution of prediction errors of color difference information. In other words, while the first and second embodiments employ different criteria for selecting encoding scheme, these embodiments may employ the same configurations and operations for encoding target information (luminance information in the second embodiment) using the selected encoding scheme.

Figure 17:
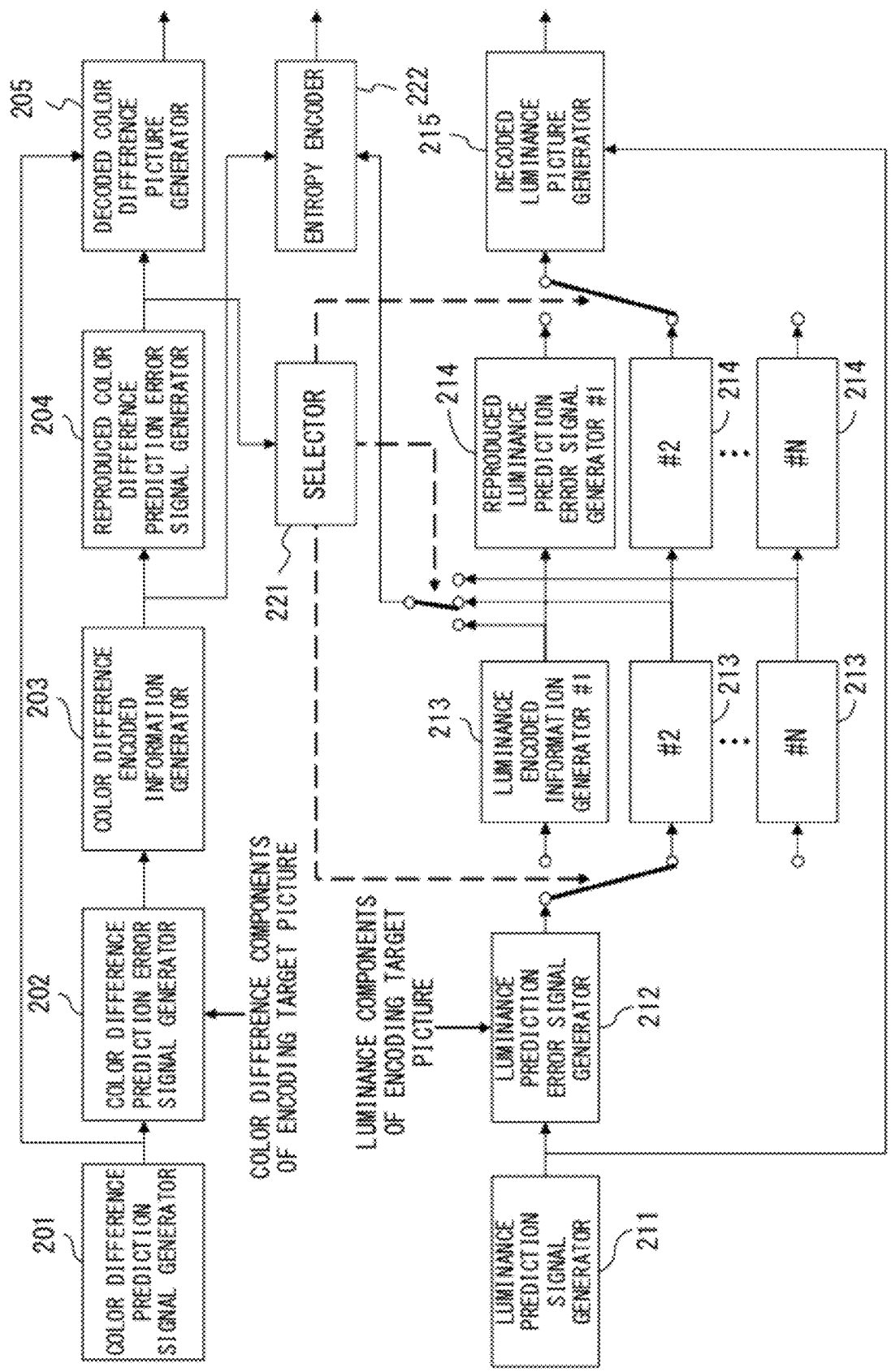
FIG. 17 illustrates a configuration of an encoder according to a second embodiment.

FIG. 17 illustrates a configuration of the encoder according to the second embodiment. Also in the second embodiment, each picture of a video is divided into a plurality of blocks, and the encoder encodes image data for each block. In the configuration illustrated in FIG. 17, luminance components and color difference components of an encoding target picture are input to the encoder.

A color difference prediction signal generator 201 generates a color difference prediction signal representing a predicted value of color difference information of an encoding target picture. The color difference prediction signal generator 201 is implemented, for example, by inter prediction or bi-directional inter frame prediction employed by MPEG-1, MPEG-2, H.264, and the like, or by intra prediction employed by H.264 and the like. Also, a prediction method for each block is determined by a specified prediction-mode decision algorithm.

A color difference prediction error signal generator 202 calculates the difference between the color difference information and the color difference prediction signal of an encoding target picture, and thereby generates a color difference prediction error signal. A color difference encoded information generator 203 reduces redundancies in the spatial direction of the color difference prediction error signal, and generates color difference encoded information. The color difference encoded information generator 203 is implemented by, for example, a combination of an orthogonal transform and quantization employed by MPEG-1, MPEG-2, H.264, and the like. In such a case, color difference encoded information is a result of quantizing coefficients that have been orthogonally transformed. The color difference encoded information generator 203 may be implemented by Wavelet transform, DPCM, vector quantization, and the like employed by JPEG-2000 and the like.

A reproduced color difference prediction error signal generator 204 generates a reproduced color difference prediction error signal from the color difference encoded information. The reproduced color difference prediction error signal generator 204 is implemented by, for example, a combination of an inverse orthogonal transform and inverse quantization employed by MPEG-1, MPEG-2, and H.264. Alternatively, the reproduced color difference prediction error signal generator 204 may be implemented by DPCM or a decoding process of vector quantization or the like.

A decoded color difference picture generator 205 adds the reproduced color difference prediction error signal to the color difference prediction signal, and thereby generates a decoded color difference picture. This decoded picture is stored as a reference picture to be used in a subsequent encoding process.

The configuration for encoding luminance information is similar to the above described configuration for encoding color difference information. Specifically, a luminance prediction signal generator 211 and a luminance prediction error signal generator 212 generate a luminance prediction signal and a luminance prediction error signal using the same methods as those used by the color difference prediction signal generator 201 and the color difference prediction error signal generator 202.

A luminance encoded information generators 213 includes a plurality of luminance encoded information generators #1 through #N. Luminance encoded information generators #1 through #N are substantially the same as encoded information generators #1 through #N illustrated in FIG. 6 according to the first embodiment. Also, a reproduced luminance prediction error signal generators 214 includes a plurality of reproduced luminance prediction error signal generators #1 through #N. Reproduced luminance prediction error signal generators #1 through #N are substantially the same as reproduced prediction error signal generators #1 through #N illustrated in FIG. 6 according to the first embodiment. Reproduced luminance prediction error signal generators #1 through #N perform the inverse process of the processes performed by luminance encoded information generators #1 through #N, respectively.

A selector 221 selects, in accordance with the distribution in a block of a prediction error of color difference information, one of luminance encoded information generators #1 through #N that is expected to minimize the information amount of luminance encoded information (or the information amount after luminance encoded information has been entropy encoded). Also, the selector 221 selects one of reproduced luminance prediction error signal generators #1 through #N that corresponds to the selected one of luminance encoded information generators #1 through #N. In other words, the selector 221 selects a pair of a luminance encoded information generator and a reproduced luminance prediction error signal generator to perform a transform and inverse transform that correspond to each other. Additionally, the prediction error of color difference information is detected from a reproduced color difference prediction error signal generated by the reproduced color difference prediction error signal generator 204. Alternatively, the prediction error of color difference information may be detected from the color difference prediction error signal generated by the color difference prediction error signal generator 202.

The luminance encoded information generator 213 generates luminance encoded information by using the luminance encoded information generator selected by the selector 221. An entropy encoder 222 performs entropy encoding on luminance encoded information and color difference encoded information. Thereby, entropy encoded information is generated.

The reproduced luminance prediction error signal generator 214 generates a reproduced luminance prediction error signal from luminance encoded information by using one of the reproduced luminance prediction error signal generators selected by the selector 221. A decoded luminance picture generator 215 adds the reproduced luminance prediction error signal to a luminance prediction signal, and thereby generates a decoded luminance picture. This decoded picture is stored as a reference picture to be used in a subsequent encoding process.

Figure 18:
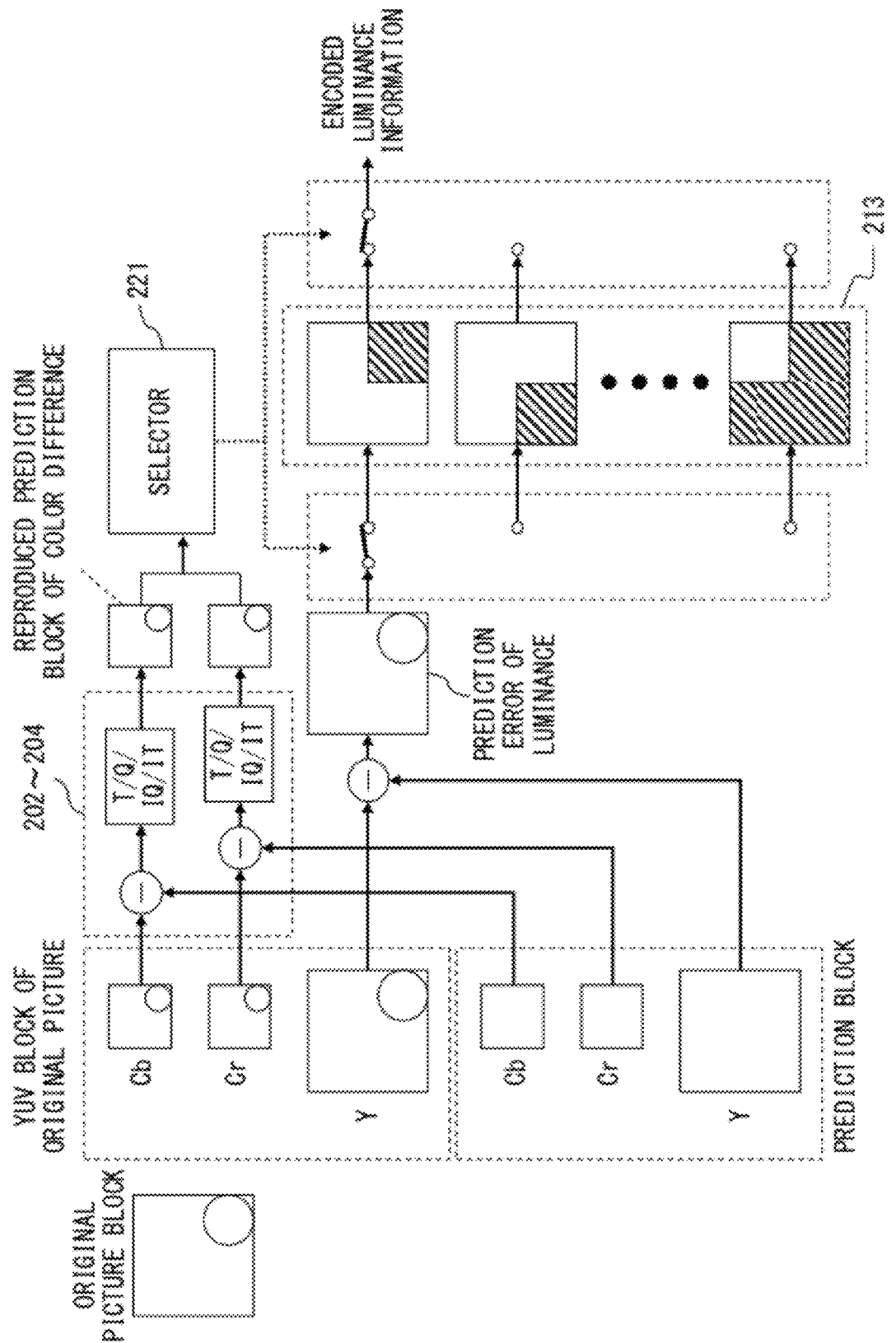
FIG. 18 illustrates an example of an operation of the encoder according to the second embodiment.

FIG. 18 illustrates an example of operations of the encoder according to the second embodiment. In this example, an original picture block is represented by Y/Cb/Cr signals. It is assumed that there is a circular texture in the lower right region of the original picture block. In such a case, as a general rule, there is a circular texture in the lower right region in the Y signal block, and similarly there is a circular texture also in the lower right region in each of the Cb/Cr signal blocks. Note that the image format of the Y/Cb/Cr signals is not limited particularly, and may be, for example, the 4:2:0 format, the 4:2:2 format, or the 4:4:4 format.

Prediction blocks represented by prediction signals (luminance prediction signal and color difference prediction signal) are also represented by Y/Cb/Cr signals similarly to the original picture blocks. Although the prediction block is similar to the original picture block, errors tend to occur often in regions having a texture in an original picture block. In the example illustrated in FIG. 18, there are no textures in a prediction block.

A luminance prediction error signal is generated by the difference between the Y signal of an original picture block and the Y signal of the prediction block. In this example, since the prediction block does not have textures, a large luminance prediction error is obtained in the lower right region in the block.

Similarly, prediction errors are generated for the Cb/Cr signal blocks. However, in this example, a color difference prediction error after performing orthogonal transform, quantization, inverse quantization, and inverse orthogonal transform (i.e., a reproduced color difference prediction error signal) is used. At this stage, there are no textures in the prediction block of Cb/Cr signals. Accordingly, a color difference prediction error is large in the lower right region in the block. In other words, prediction errors in the lower right regions are large both in the luminance block and the color difference block.

The selector 221 selects a transform rule that corresponds to the distribution of the color difference prediction errors. At this time, the selector 221 selects a transform rule in accordance with the distribution of Cb prediction errors and Cr prediction errors. In such a case, a transform rule is selected in accordance with the distribution of added values obtained by adding Cb prediction error and Cr prediction error for each pixel. Note that the selector 221 may select a transform rule in accordance with the distribution of either Cb prediction error or Cr prediction error.

In the example illustrated in FIG. 18, the color difference prediction error signal has a distribution involving a large error in the lower right region in the block. In such a case, the selector 221 selects, from among a plurality of transform rules that have been prepared beforehand, a transform rule giving priority to the lower right region. A "transform rule giving priority to the lower right region" is determined in such a manner that the information amount of encoded data of a luminance prediction error signal is reduced when the error is large in the lower right region of the corresponding luminance prediction error block. The plurality of transform rules are, for example, orthogonal transform bases of the first embodiment.

A method of detecting the distribution of color difference prediction error may be implemented by a similar method as the one described with respect to the first embodiment. In other words, a color difference prediction error block is divided into four regions and the sum of the absolute values of the color difference prediction error is compared with a specified threshold for each region so that the distribution of color difference prediction errors is detected.

Figure 19:
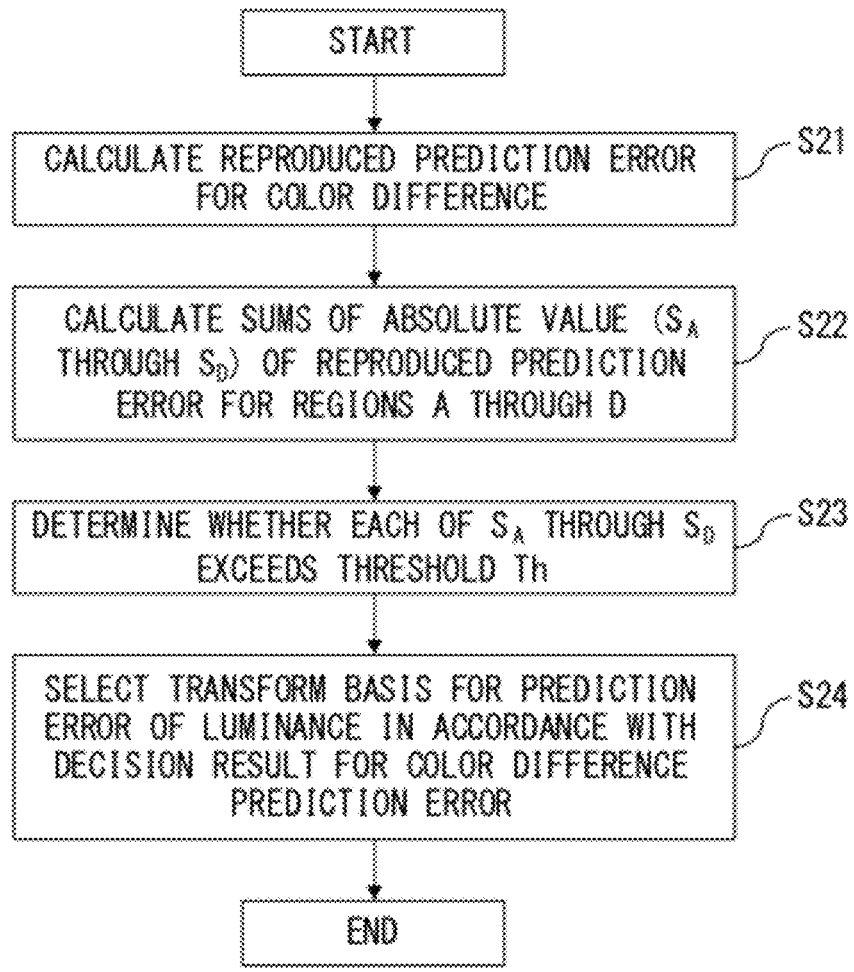
FIG. 19 is a flowchart indicating a method of selecting a transform rule of luminance information.

FIG. 19 is a flowchart indicating a method of selecting a transform rule of luminance information. In step S21, the color difference prediction error signal generator 202 generates a color difference prediction error signal. Next, the color difference encoded information generator 203 generates color difference encoded information from the color difference prediction error signal. Thereafter, the reproduced color difference prediction error signal generator 204 generates a reproduced color difference prediction error signal from the encoded information.

In step S22, the selector 221 divides, into four regions, a color difference prediction error block represented by the reproduced color difference prediction error signal, and calculates sums $S_A$ through $S_D$ of the error values of the respective regions. In step S23, the selector 221 compares each of the sums $S_A$ through $S_D$ with threshold Th. Thereby, the distribution pattern of color difference prediction errors is determined for an encoding target block. Then, in step S24, the selector 221 selects a basis for performing an orthogonal transform on the luminance prediction error in accordance with the distribution pattern of the color difference prediction error. The luminance encoded information generator 213 generates a luminance prediction error signal using the selected basis, and the reproduced luminance prediction error signal generator 214 performs an inverse transform on the luminance encoded information using the selected basis.

Figure 20:
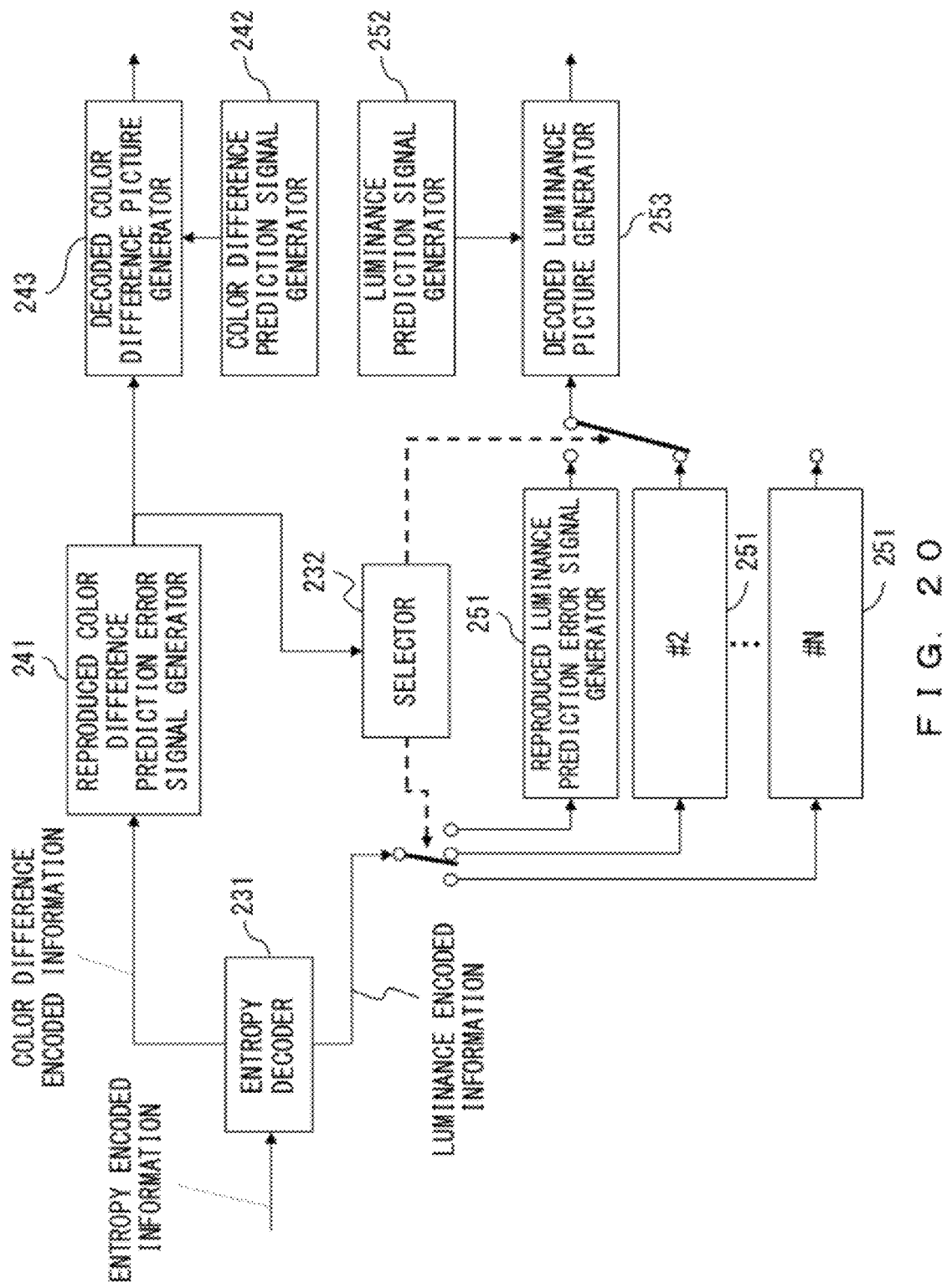
FIG. 20 illustrates a configuration of a decoder according to the second embodiment.

FIG. 20 illustrates a configuration of the decoder according to the second embodiment. The decoder of the second embodiment decodes an encoded data stream (entropy encoded information) that is generated by the encoder illustrated in FIG. 17. The decoder performs the inverse process of the process performed by the encoder. Also, the decoder performs a decoding process for each block.

An entropy decoder 231 decodes entropy encoded information so as to reproduce color difference encoded information and luminance encoded information. A reproduced color difference prediction error signal generator 241 generates a reproduced color difference prediction error signal from the color difference encoded information. Also, a color difference prediction signal generator 242 generates a color difference prediction signal. Operations of the reproduced color difference prediction error signal generator 241 and the color difference prediction signal generator 242 are substantially the same as those of the reproduced color difference prediction error signal generator 204 and the color difference prediction signal generator 201 included in the encoder. A decoded color difference picture generator 243 adds the reproduced color difference prediction error signal to the color difference prediction signal so as to generate a decoded color difference picture.

A selector 232 selects, in accordance with the reproduced color difference prediction error signal, a reproduction rule for generating a reproduced luminance prediction error signal from luminance encoded information. The reproduced color difference prediction error signal generated by the reproduced color difference prediction error signal generator 241 is substantially the same as the reproduced color difference prediction error signal generated by the reproduced color difference prediction error signal generator 204 included in the encoder. Accordingly, the same rules are selected by the encoder and the decoder. In other words, the decoder can select, without receiving a dedicated notification from the encoder, a reproduction rule corresponding to a generation rule used by the luminance encoded information generator in the encoder.

A reproduced luminance prediction error signal generator 251 generates a reproduced luminance prediction error signal from the luminance encoded information in accordance with the selected reproduction rule. Also, a luminance prediction signal generator 252 generates a luminance prediction signal. Note that operations of the reproduced luminance prediction error signal generator 251 and the luminance prediction signal generator 252 are substantially the same as those of the reproduced luminance prediction error signal generator 214 and the luminance prediction signal generator 211 included in the encoder. A decoded luminance picture generator 253 adds the reproduced luminance prediction error signal to the luminance prediction signal, and thereby generates a decoded luminance picture.

As has been described above, the video encoding/decoding methods according to the second embodiment utilize correlations between the distribution of error values of color difference prediction error signal and the distribution of error values of luminance prediction error signal. In other words, a method for encoding/decoding a luminance prediction error signal is selected in accordance with the distribution of error values of color difference prediction error signal. Accordingly, the spatial redundancy of luminance prediction error is reduced and thus the information amount of encoded information is reduced compared with conventional methods (for example, a method that uses a DCT transform regardless of the characteristics of images). Also, since the encoder and the decoder generates substantially the same prediction error signals, the decoder can select the corresponding decoding scheme without receiving information specifying an encoding scheme from the encoder. Further, since an appropriate encoding method (a transform rule in this example) in accordance with the characteristics of images is selected, the information amount of encoded information is reduced even when the block involves a large prediction error (for example, a region having fine textures or a scene involving sharp movements).

<Variation>

In the above explanation, a transform/reproduction rule for a prediction error signal is selected in accordance with the distribution of differences between a forward motion compensation signal and a backward motion compensation signal in the first embodiment. However, the first embodiment is not limited to this method. Specifically, it is also possible in the first embodiment to, for example, select a transform/reproduction rule for a prediction error signal in accordance with the distribution of correlations between a forward motion compensation signal and a backward motion compensation signal.

Also, in the above explanations, a transform rule for orthogonally transforming a prediction error signal is selected according to the first embodiment. Further, a transform rule for orthogonally transforming a luminance prediction error signal is selected according to the second embodiment. However, the first and second embodiments are not limited to these methods. Specifically, for example, the first embodiment may employ a configuration in which a rule for a quantization calculation to be executed after orthogonal transform is selected in accordance with a motion compensation signal. This also applies to the second embodiment.

<Hardware Configuration>

Figure 21:
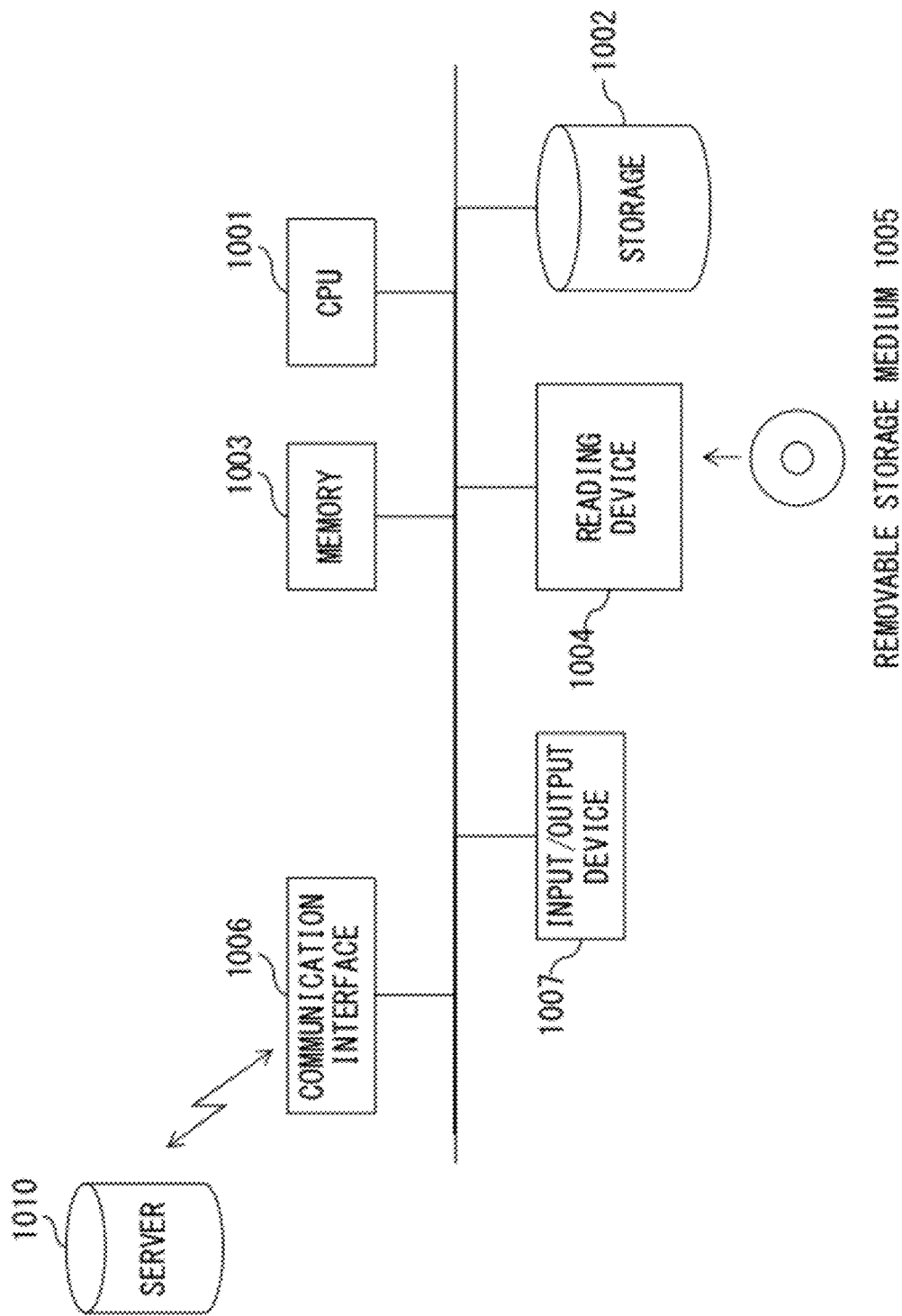
FIG. 21 illustrates a hardware configuration of the encoder and the decoder.

FIG. 21 illustrates a hardware configuration of the encoders or decoders (or a computer or a processor system to implement the encoding/decoding methods) according to the respective embodiments. In FIG. 21, a CPU 1001 uses memory 1003 in order to execute an encoding program or a decoding program. A storage 1002 stores the encoding program or the decoding program. Note that the storage 1002 may be an external storage. The memory 1003 is, for example, semiconductor memory, and is configured to have a RAM area and a ROM area.

A reading device 1004 accesses a removable storage medium 1005 in accordance with an instruction from the CPU 1001. The removable storage medium 1005 includes, for example, a semiconductor device, a medium that inputs and outputs information utilizing magnetic effects, and a medium that inputs and outputs information utilizing optical effects. A communication interface 1006 transmits and receives data via a network in accordance with an instruction from the CPU 1001. An input/output device 1007 corresponds, in this example, to a display, a device to receive instructions from a user, or the like.

The encoding program or the decoding program according to embodiments is provided, for example, in the forms described below.

(1) Provided already installed in the storage 1002
(2) Provided in the removable storage medium 1005
(3) Provided by being downloaded from a program server 1010

The encoder or the decoder according to the embodiments is implemented by the execution of the encoding program or the decoding program on a computer of the configuration described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A video encoder, comprising:
   a motion compensation signal generator to generate a plurality of motion compensation signals in accordance with an encoding target signal representing an encoding target picture and a plurality of reference pictures;
   a prediction signal generator to generate a prediction signal of the encoding target signal by utilizing the plurality of motion compensation signals;
   a prediction error signal generator to generate a prediction error signal representing a difference between the encoding target signal and the prediction signal;
   a selector to select, from among a plurality of generation rules for generating encoded information of the prediction error signal, a generation rule that is expected to reduce an information amount of an encoded state of the prediction error signal, in accordance with the plurality of motion compensation signals; and
   an encoded information generator to generate encoded information of the prediction error signal in accordance with the generation rule selected by the selector.

2. The video encoder according to claim 1, wherein
   the motion compensation signal generator generates a first motion compensation signal from a reference picture for forward motion compensation and a second motion compensation signal from a reference picture for backward motion compensation, and
   the selector selects, in accordance with a difference between the first and second motion compensation signals, a generation rule under which the encoded information generator generates the encoded information.

3. The video encoder according to claim 2, wherein
   the selector selects a generation rule corresponding to a distribution of difference values between the first and second motion compensation signals.

4. The video encoder according to claim 1, wherein
   the motion compensation signal generator generates a first motion compensation signal from a reference picture for forward motion compensation and a second motion compensation signal from a reference picture for backward motion compensation, and
   the selector selects, in accordance with a correlation between the first and second motion compensation signals, a generation rule under which the encoded information generator generates the encoded information.

5. The video encoder according to claim 1, further comprising:
   a reproduced prediction error signal generator to generate a reproduced prediction error signal from the encoded information;
   a decoded picture generator to generate a locally decoded picture from the reproduced prediction error signal; and
   a reference picture accumulator to accumulate the locally decoded picture as a reference picture, wherein
   the selector selects, from among a plurality of reproduction rules prepared in association with the plurality of generation rules, a reproduction rule corresponding to the generation rule selected for the encoded information generator, and
   the reproduced prediction error signal generator generates the reproduced prediction error signal from the encoded information in accordance with the reproduction rule selected by the selector.

6. The video encoder according to claim 1, further comprising:
   an entropy encoder to generate entropy encoded information from the encoded information, wherein
   the selector selects a generation rule that is expected to reduce an information amount of the entropy encoded information.

7. A video decoder that decodes encoded information generated by a video encoder, the video decoder comprising:
   a motion compensation signal generator to generate a plurality of motion compensation signals in accordance with a plurality of reference pictures;
   a prediction signal generator to generate a prediction signal of a decoded picture by utilizing the plurality of motion compensation signals;
   a selector to select, from among a plurality of reproduction rules for generating a reproduced prediction error signal from the encoded information, a reproduction rule that is determined in accordance with the plurality of motion compensation signals;
   a reproduced prediction error signal generator to generate a reproduced prediction error signal from the encoded information in accordance with the reproduction rule selected by the selector; and
   a decoded picture generator to generate a decoded picture from the reproduced prediction error signal and the prediction signal.

8. The video decoder according to claim 7, wherein
   the motion compensation signal generator generates a first motion compensation signal from a reference picture for forward motion compensation and a second motion compensation signal from a reference picture for backward motion compensation; and
   the selector selects, in accordance with a difference between the first and second motion compensation signals, a reproduction rule under which the reproduced prediction error signal generator generates the reproduced prediction error signal.

9. The video decoder according to claim 8, wherein:
the selector selects a reproduction rule corresponding to a distribution of difference values between the first and second motion compensation signals.

10. The video decoder according to claim 7, wherein:
the motion compensation signal generator generates a first motion compensation signal from a reference picture for forward motion compensation and a second motion compensation signal from a reference picture for backward motion compensation; and
the selector selects, in accordance with a correlation between the first and second motion compensation signals, a reproduction rule under which the reproduced prediction error signal generator generates the reproduced prediction error signal.

11. A video encoding method, comprising:
generating a plurality of motion compensation signals in accordance with an encoding target signal representing an encoding target picture and a plurality of reference pictures;
generating a prediction signal of the encoding target signal by utilizing the plurality of motion compensation signals;
generating a prediction error signal representing a difference between the encoding target signal and the prediction signal;
selecting, from among a plurality of generation rules for generating encoded information of the prediction error signal, a generation rule that is expected to reduce an information amount of an encoded state of the prediction error signal, in accordance with the plurality of motion compensation signals; and
generating encoded information of the prediction error signal in accordance with the selected generation rule.

12. A video decoding method of decoding encoded information generated by a video encoder, the video decoding method comprising:
generating a plurality of motion compensation signals in accordance with a plurality of reference pictures;
generating a prediction signal of a decoded picture by utilizing the plurality of motion compensation signals;
selecting, from among a plurality of reproduction rules for generating a reproduced prediction error signal from the encoded information, a reproduction rule that is determined in accordance with the plurality of motion compensation signals;
generating a reproduced prediction error signal from the encoded information in accordance with the selected reproduction rule; and
generating a decoded picture from the reproduced prediction error signal and the prediction signal.

13. A video encoder that encodes an encoding target signal including a luminance signal and a color difference signal, the video encoder comprising:
a luminance prediction signal generator to generate a luminance prediction signal representing a predicted value of a luminance signal;
a luminance prediction error signal generator to generate a luminance prediction error signal representing a difference between the luminance signal of the encoding target signal and the luminance prediction signal;
a color difference prediction signal generator to generate a color difference prediction signal representing a predicted value of a color difference signal;
a color difference prediction error signal generator to generate a color difference prediction error signal representing a difference between the color difference signal of the encoding target signal and the color difference prediction signal;
a selector to select, from among a plurality of generation rules for generating luminance encoded information from the luminance prediction error signal, a generation rule that is expected to reduce an information amount of an encoded state of the luminance prediction error signal, in accordance with the color difference prediction error signal; and
a luminance encoded information generator to generate luminance encoded information from the luminance prediction error signal in accordance with the generation rule selected by the selector.

14. The video encoder according to claim 13, further comprising:
a color difference encoded information generator to generate color difference encoded information from the color difference prediction error signal; and
a reproduced color difference prediction error signal generator to generate a reproduced color difference prediction error signal representing a reproduced value of a prediction error of a color difference from the color difference encoded information, wherein
the selector selects the generation rule in accordance with the reproduced color difference prediction error signal.

15. A video decoder that decodes encoded information including a luminance signal and a color difference signal generated by a video encoder, the video decoder comprising:
a luminance prediction signal generator to generate a luminance prediction signal representing a predicted value of a luminance signal;
a reproduced color difference prediction error signal generator to generate a reproduced color difference prediction error signal from color difference encoded information included in the encoded information;
a selector to select, from among a plurality of reproduction rules for generating a reproduced luminance prediction error signal from luminance encoded information included in the encoded information, a reproduction rule that is determined in accordance with the reproduced color difference prediction error signal;
a reproduced luminance prediction error signal generator to generate a reproduced luminance prediction error signal from the luminance encoded information in accordance with the reproduction rule selected by the selector; and
a decoded luminance picture generator to generate a decoded luminance picture from the reproduced luminance prediction error signal and the luminance prediction signal.

16. A video encoding method of encoding an encoding target signal including a luminance signal and a color difference signal, the video encoding method comprising:
generating a luminance prediction signal representing a predicted value of a luminance signal;
generating a luminance prediction error signal representing a difference between the luminance signal of the encoding target signal and the luminance prediction signal;
generating a color difference prediction signal representing a predicted value of a color difference signal;
generating a color difference prediction error signal representing a difference between the color difference signal of the encoding target signal and the color difference prediction signal;

selecting, from among a plurality of generation rules for generating luminance encoded information from the luminance prediction error signal, a generation rule that is expected to reduce an information amount of an encoded state of the luminance prediction error signal, in accordance with the color difference prediction error signal; and generating luminance encoded information from the luminance prediction error signal in accordance with the generation rule selected by the selector.

17. A video decoding method of decoding encoded information including a luminance signal and a color difference signal generated by a video encoder, the video decoding method comprising:

generating a luminance prediction signal representing a predicted value of a luminance signal;

generating a reproduced color difference prediction error signal from color difference encoded information included in the encoded information;

selecting, from among a plurality of reproduction rules for generating a reproduced luminance prediction error signal from luminance encoded information included in the encoded information, a reproduction rule that is determined in accordance with the reproduced color difference prediction error signal;

generating a reproduced luminance prediction error signal from the luminance encoded information in accordance with the selected reproduction rule; and generating a decoded luminance picture from the reproduced luminance prediction error signal and the luminance prediction signal.

* * * * *